(12) United States Patent
Wakita et al.

(10) Patent No.: US 9,550,896 B2
(45) Date of Patent: Jan. 24, 2017

(54) POLYORGANOSILOXANE LATEX, GRAFT COPOLYMER USING THE SAME, THERMOPLASTIC RESIN COMPOSITION, AND MOLDED BODY

(71) Applicants: Mitsubishi Rayon Co., Ltd., Chiyoda-ku (JP); UMG ABS, Ltd.

(72) Inventors: Ayaka Wakita, Otake (JP); Toshihiro Kasai, Otake (JP); Hidemichi Kouno, Ube (JP); Shigenari Takeda, Ube (JP)

(73) Assignees: Mitsubishi Rayon Co., Ltd., Tokyo (JP); UMG ABS, Ltd., Tokyo (JP)

( * ) Notice: Subject to any disclaimer, the term of this patent is extended or adjusted under 35 U.S.C. 154(b) by 0 days.

(21) Appl. No.: 15/010,246

(22) Filed: Jan. 29, 2016

(65) Prior Publication Data

US 2016/0185965 A1  Jun. 30, 2016

Related U.S. Application Data

(62) Division of application No. 13/984,206, filed as application No. PCT/JP2012/052914 on Feb. 9, 2012.

(30) Foreign Application Priority Data

Feb. 9, 2011  (JP) ................. 2011-026088

(51) Int. Cl.
| | |
|---|---|
| C08L 51/00 | (2006.01) |
| C08L 83/06 | (2006.01) |
| C08F 290/06 | (2006.01) |
| C08L 83/04 | (2006.01) |
| F21S 8/10 | (2006.01) |
| C08G 77/42 | (2006.01) |
| C08K 3/20 | (2006.01) |
| C08L 83/10 | (2006.01) |
| C08F 283/12 | (2006.01) |
| C08L 25/12 | (2006.01) |
| C08L 51/08 | (2006.01) |
| C08G 77/20 | (2006.01) |

(52) U.S. Cl.
CPC ............ *C08L 83/06* (2013.01); *C08F 283/124* (2013.01); *C08F 290/068* (2013.01); *C08G 77/42* (2013.01); *C08K 3/20* (2013.01); *C08L 25/12* (2013.01); *C08L 51/00* (2013.01); *C08L 51/085* (2013.01); *C08L 83/04* (2013.01); *C08L 83/10* (2013.01); *F21S 48/1233* (2013.01); *F21S 48/2212* (2013.01); *F21S 48/31* (2013.01); *C08G 77/20* (2013.01); *C08L 2201/52* (2013.01); *C08L 2205/03* (2013.01); *Y10T 428/2982* (2015.01)

(58) Field of Classification Search
CPC ....................................................... C08L 51/00
USPC ................................... 524/801; 525/63, 451
See application file for complete search history.

(56) References Cited

FOREIGN PATENT DOCUMENTS

| | | | |
|---|---|---|---|
| JP | 05-194740 | A | 8/1993 |
| JP | 06-025492 | A | 2/1994 |
| JP | 10-279684 | A | 10/1998 |
| JP | 10-338748 | A | 12/1998 |
| JP | 2000-072983 | A | 3/2000 |
| JP | 2002-308909 | A | 10/2002 |
| JP | 2003-026807 | A | 1/2003 |
| JP | 2003026807 | A * | 1/2003 |
| JP | 2003-128868 | A | 5/2003 |
| JP | 2003-160624 | A | 6/2003 |
| JP | 2003-292507 | A | 10/2003 |
| JP | 2004-331726 | A | 11/2004 |
| JP | 2004-359889 | A | 12/2004 |
| JP | 2007-204587 | A | 8/2007 |
| JP | 2007-217488 | A | 8/2007 |
| JP | 2007-321066 | A | 12/2007 |
| JP | 2007321066 | A * | 12/2007 |
| JP | 2011-179016 | A | 9/2011 |
| KR | 10-2006-0007026 | A | 1/2006 |
| WO | 2009/011280 | A1 | 1/2009 |

* cited by examiner

*Primary Examiner* — Kelechi Egwim
(74) *Attorney, Agent, or Firm* — Morgan, Lewis & Bockius LLP

(57) ABSTRACT

A variety of molded bodies having high weatherability, impact resistance, designability, and the like, and a polyorganosiloxane latex and a graft copolymer used as the raw materials therefor are provided, where the polyorganosiloxane latex has a mass average particle diameter (Dw) of a polyorganosiloxane particle of 100 to 200 nm, and a ratio of the mass average particle diameter (Dw) to a number average particle diameter (Dn) (Dw/Dn) of 1.0 to 1.7. A polyorganosiloxane-containing vinyl-based copolymer (g) obtained by polymerizing one or more vinyl-based monomers in the presence of the latex. A graft copolymer (G) is obtained by graft polymerizing one or more vinyl-based monomers in the presence of the copolymer. A thermoplastic resin composition includes the graft copolymer (G) and a thermoplastic resin (Ha) except for the graft copolymer (G). A molded body is obtained by molding the resin composition.

7 Claims, No Drawings

POLYORGANOSILOXANE LATEX, GRAFT COPOLYMER USING THE SAME, THERMOPLASTIC RESIN COMPOSITION, AND MOLDED BODY

TECHNICAL FIELD

The present invention relates to a polyorganosiloxane latex, a graft copolymer using the polyorganosiloxane latex, a thermoplastic resin composition, and a molded body.

BACKGROUND ART

Polyorganosiloxane latexes are widely used as raw materials for resin additives, fiber treatment agents, mold release agents, cosmetics, antifoaming agents, additives for a coating material, and the like. Various methods have been proposed as the method of producing a polyorganosiloxane latex. For example, Patent Literature 1 and Patent Literature 2 describe polyorganosiloxane latexes obtained by emulsion polymerizing organosiloxane in an aqueous medium.

Polyorganosiloxane in a latex exhibits different properties depending on the particle diameter. When a polyorganosiloxane latex is used as a raw material for resin additives, fiber treatment agents, mold release agents, cosmetics, antifoaming agents, additives for a coating material, and the like, a polyorganosiloxane latex having the particle diameter optimal to the application is required in order to exhibit the performance which each of these target products requires. Thus, polyorganosiloxane having a controlled particle diameter and particle diameter distribution is useful.

For polyorganosiloxane contained in the latexes produced by the methods described in these Patent Literatures, the mass average particle diameter (Dw) is 150 to 800 nm, particle diameter distribution (Dw/Dn) expressed as a ratio of the mass average particle diameter (Dw) to the number average particle diameter (Dn) is 1.2 or less (Patent Literature 1), the number average particle diameter is 100 nm or less, and the standard deviation of the particle diameter is 70 nm or less (Patent Literature 2) as described in these Patent Literatures. Unfortunately, the methods described in these Patent Literatures actually have difficulties to obtain polyorganosiloxane having the mass average particle diameter of 100 nm to 200 nm and Dw/Dn of 1.7 or less.

Automobile lights such as a taillight, a brake light, and a headlight for automobiles mainly include a lens made of a transparent resin such as a polymethyl methacrylate (PMMA) resin and a polycarbonate (PC) resin and a housing that supports the lens. Among these, the housing is partially exposed to the sunlight outdoors. For this reason, the housing formed of a material having high weatherability has been desired in these days.

In production of the automobile light in the related art, the lens is bonded to the housing with a hot-melt adhesive, and integrated. To increase productivity, recently, the lens is bonded to the housing by a vibration welding method in some cases. Here, the vibration welding method is a welding method utilizing frictional heat in which in the state where the periphery end of the lens is pressed against the periphery end of the housing, vibration having a amplitude of 0.5 mm to 2.0 mm and the number of vibration of 200 Hz to 300 Hz is applied to generate frictional heat between the lens and the housing; thereby, the lens and the housing are fused, bonded, and integrated. In such a vibration welding method, the finished bonded portion of the lens and the housing needs to have a good appearance.

For the material for vibration welding, a thermoplastic resin composition containing a graft copolymer containing a composite rubber-based polymer consisting of polyorganosiloxane including vinyl polymerizable functional group-containing siloxane and alkyl (meth)acrylate rubber is disclosed.

A thermoplastic resin molded body for automobile parts and casings for a variety of electrical appliances may be subjected to a plating surface treatment for forming a metallic film made of a material such as copper, chromium, and nickel on the surface of the molded body to enhance designability and other functionalities. Moreover, a metallization treatment for forming a metallic film of aluminum, chromium, or the like (thickness of several dozen nanometers to several hundred nanometers) may be performed on the surface of the thermoplastic resin molded body by a vacuum deposition method, a sputtering method, or the like.

In the latter metallization treatment, to enhance the brightness of the molded body, an undercoat layer is usually formed by coating or plasma polymerization in advance before performing metallization treatment. Further, to protect the metallic film obtained by metallization treatment, a top coat layer composed of a silicon-based material or the like is usually formed.

Thus, conventional metallization treatment needs many steps, a dedicated apparatus, and an expensive treatment agent, while the so-called "direct deposition method" eliminating the step for forming the undercoat layer is used these days. The designability of the molded body obtained by the direct deposition method easily changes according to the kind of resin materials and the state of the surface of the molded body. For this reason, one of important problems is to stably maintain a beautiful bright appearance of the surface without fogging.

For the resin material suitable for the direct deposition, Patent Literature 3 discloses a thermoplastic resin containing a rubber-containing graft copolymer prepared by graft polymerizing a vinyl-based monomer with a rubber-based polymer having specific particle diameter distribution. Moreover, Patent Literature 3 discloses a thermoplastic resin composition in which the mass average particle diameter of the rubber-based polymer and the proportion of the component (% by mass) have a specific relationship.

Meanwhile, automobile members tend to be lighter these days. For this reason, the automobile members need to have higher physical properties such as impact resistance than ever. In addition to high heat resistance, the level of a demand for a beautiful bright appearance has been increased year after year. Unfortunately, the thermoplastic resin composition disclosed in Patent Literature 3 cannot sufficiently meet the recent demand for high brightness and impact resistance.

Further, recent thermoplastic resin compositions used for vehicle members and construction members need high mechanical strength under a low temperature. Efforts have been made so far to improve the surface appearance and impact resistance of the molded article made from a composite rubber-based graft copolymer prepared from a polyorganosiloxane rubber and an acrylic rubber in combination and the performance of impact resistance. For example, Patent Literature 4 discloses a thermoplastic resin composition comprising a polyorganosiloxane/acrylic composite rubber-based graft copolymer in which the average particle diameter is 10 to 70 nm and the proportion of particles having a particle diameter more than 100 nm is 20% or less based on the total particle volume. Such a resin composition, however, cannot achieve the performance that sufficiently meets the recent demand.

CITATION LIST

Patent Literature

Patent Literature 1: JP2007-321066A
Patent Literature 2: JP05-194740A
Patent Literature 3: JP2003-128868A
Patent Literature 4: JP06-25492A

SUMMARY OF INVENTION

Technical Problem

An object of the present invention is to provide a variety of molded bodies (in particular, automobile parts, casings for a variety of electrical appliances, construction members and the like) having high weatherability, impact resistance, designability and the like; and a polyorganosiloxane latex and a graft copolymer as raw materials for these molded bodies.

Solution to Problem

The problems above are solved by aspects [1] to [24] according to the present invention below.

[1] A polyorganosiloxane latex, wherein a mass average particle diameter (Dw) of a polyorganosiloxane particle is 100 to 200 nm, and wherein a ratio (Dw/Dn) of the mass average particle diameter (Dw) to a number average particle diameter (Dn) of the particle is 1.0 to 1.7.

[2] The polyorganosiloxane latex according to [1], wherein a standard deviation of the mass average particle diameter (Dw) of the polyorganosiloxane particle is 0 to 80.

[3] The polyorganosiloxane latex according to [1] or [2], wherein a proportion of the polyorganosiloxane particle having a particle diameter less than 50 nm is 5% by mass or less based on the total amount of the particle, and wherein a proportion of the polyorganosiloxane particle having a particle diameter of 300 nm or more is 20% by mass or less based on the total amount of the particle.

[4] A polyorganosiloxane-containing vinyl-based copolymer obtained by polymerizing one or more vinyl-based monomers in the presence of the polyorganosiloxane latex according to any one of [1] to [3].

[5] The polyorganosiloxane-containing vinyl-based copolymer according to [4], wherein a mass average particle diameter (Dw) of a particle in the polyorganosiloxane-containing vinyl-based copolymer is 110 nm to 800 nm, and a ratio (Dw/Dn) of the mass average particle diameter (Dw) to a number average particle diameter (Dn) of the particle is 1.0 to 2.0.

[6] The polyorganosiloxane-containing vinyl-based copolymer according to [4] or [5], wherein the vinyl-based monomer is an acrylic acid ester.

[7] A graft copolymer (G) obtained by graft polymerizing one or more vinyl-based monomers in the presence of the polyorganosiloxane-containing vinyl-based copolymer according to any one of [1] to [4].

[8] The graft copolymer (G) according to [7], wherein a molded body obtained by molding the following composition exhibits the following performance (1) and (2) when evaluated under the following measurement conditions:

(1) a Charpy impact strength at 23° C. is 6 kJ/m² or more, and
(2) a diffuse reflectance is 5% or less.

<Test Piece Production Condition>

(a) 33 parts by mass of a graft copolymer (Ga),
(b) 9 parts by mass of an acrylonitrile.styrene copolymer including 25% by mass of an acrylonitrile unit and 75% by mass of a styrene unit and having a reduced viscosity (ηsp/c) of 0.40 dL/g in an N,N-dimethylformamide solution of 0.2 g/dL at 25° C.,
(c) 9 parts by mass of an acrylonitrile-styrene copolymer including 28% by mass of an acrylonitrile unit and 72% by mass of a styrene unit and having a reduced viscosity of 0.62 dL/g in an N,N-dimethylformamide solution of 0.2 g/dL at 25° C.,
(d) 50 parts by mass of an acrylonitrile-styrene-N-phenylmaleimide copolymer including 22% by mass of an acrylonitrile unit, 55% by mass of a styrene unit, and 23% by mass of an N-phenylmaleimide unit and having a reduced viscosity of 0.66 dL/g in an N,N-dimethylformamide solution of 0.2 g/dL at 25° C.,
(e) 0.5 parts by mass of ethylenebisstearylamide,
(f) 0.03 parts by mass of silicone oil, and
(g) 0.05 parts by mass of carbon black.

These seven materials (a) to (g) above are blended, and kneaded using a volatilizing extruder (TEX-30α made by The Japan Steel Works, Ltd.) whose barrel is heated to a temperature of 260° C. to obtain pellets; the pellets are molded using a 4-ounce injection molding machine (made by The Japan Steel Works, Ltd.) in conditions of a cylinder temperature of 260° C. and a mold temperature of 60° C. to obtain a test piece 1 (a length of 80 mm, a width of 10 mm and a thickness of 4 mm); and a plate-like molded body 2 (a length of 100 mm, a width of 100 mm and a thickness of 2 mm) is obtained in the same manner as above in conditions of a cylinder temperature of 260° C., a mold temperature of 60° C., and an injection rate of 5 g/sec.

<Charpy Impact Strength Measurement Condition>

Measurement is conducted on a V-notched test piece 1 that is left under a 23° C. atmosphere for 12 hours or more by a method according to ISO 179.

<Diffuse Reflectance Measurement Condition>

A 50 nm aluminum film is formed (direct deposition) on the surface of the molded body 2 by a vacuum deposition method (VPC-1100 made by ULVAC-PHI, Inc.) in conditions of a degree of vacuum of $6.0\times10^{-3}$ Pa and a film forming rate of 10 angstroms/sec; and a diffuse reflectance (%) of the obtained molded body is measured using a reflectance meter (TR-1100AD made by Tokyo Denshoku Co., Ltd.).

[9] The graft copolymer (Ga) according to [8], comprising 5 to 25% by mass of polyorganosiloxane based on 100% by mass of a polyorganosiloxane-containing vinyl-based copolymer, wherein a mixture of a vinyl cyanide-based monomer and an aromatic vinyl-based monomer is graft polymerized with the polyorganosiloxane-containing vinyl-based copolymer, wherein the polyorganosiloxane-containing vinyl-based copolymer has a mass average particle diameter (Dw) of 120 to 200 nm, wherein a proportion of a particle having a particle diameter of 100 nm or less is 15% by mass or less of a total amount of the particle, and wherein a proportion of the particle having a particle diameter of 400 nm or more is 1% by mass or less of the total amount of the particle.

[10] The graft copolymer (Ga) according to [8] or [9], wherein the polyorganosiloxane contains 0.5 to 5 parts by mass of a component derived from a siloxane-based crosslinking agent based on 100 parts by mass of the organosiloxane.

[11] A thermoplastic resin composition (Ia) including the graft copolymer (Ga) according to any one of [8] to [10], and a thermoplastic resin (Ha) except for the graft copolymer (Ga).

[12] The thermoplastic resin composition (Ia) according to [11], wherein the thermoplastic resin (Ha) is a copolymer including 0 to 40% by mass of a vinyl cyanide-based monomer unit, 40 to 80% by mass of an aromatic vinyl-based monomer unit, and 0 to 60% by mass of another monomer unit whose monomer is copolymerizable with these monomers.

[13] A molded body obtained by molding the thermoplastic resin composition (Ia) according to [11] or [12].

[14] A lamp housing for vehicle lighting including a molded body obtained by molding the thermoplastic resin composition (Ia) according to [11] or [12].

[15] The graft copolymer (G) according to [7], wherein a molded body obtained by molding the following composition exhibits the following performance (1) and (2) when evaluated under the following measurement conditions:

(1) L* is 24 or less, and
(2) a Charpy impact strength at –30° C. is 6 kJ/m$^2$ or more.

<Test Piece Production Condition>
(a) 42 parts by mass of a graft copolymer (Gb),
(b) 58 parts by mass of an acrylonitrile-styrene copolymer including 34% by mass of an acrylonitrile unit and 66% by mass of a styrene unit and having a reduced viscosity ($\eta$sp/c) of 0.62 dL/g in an N,N-dimethylformamide solution of 0.2 g/dL at 25° C.,
(c) 0.3 parts by mass of ethylenebisstearylamide, and
(d) 0.5 parts by mass of carbon black.

These four materials (a) to (d) above are blended, and kneaded using a volatilizing extruder (made by Ikegai Corp., PCM-30) whose barrel is heated to a temperature of 230° C. to obtain pellets; the pellets are molded using a fl-ounce injection molding machine (made by The Japan Steel Works, Ltd.) in conditions of a cylinder temperature of 230° C. and a mold temperature of 60° C. to obtain a test piece 3 (length of 80 mm, width of 10 mm, and thickness of 4 mm) and a tensile test piece 4 (length of 170 mm, width of 20 mm, and thickness of 4 mm).

<Charpy Impact Strength Measurement Condition>
Measurement is conducted on a V-notched test piece 3 that is left under a –30° C. atmosphere for 12 hours or more by a method according to ISO 179.

<L* Measurement Condition>
L* is measured for the tensile test piece 4 using a spectrophotometer CM-508D made by Konica Minolta Sensing, Inc. on a side opposite to a gate.

[16] The graft copolymer (Gb) according to [15], comprising 15 to 80% by mass of polyorganosiloxane based on 100% by mass of a polyorganosiloxane-containing vinyl-based copolymer, wherein a mixture of a vinyl cyanide-based monomer and an aromatic vinyl-based monomer is graft polymerized with the polyorganosiloxane-containing vinyl-based copolymer, wherein the polyorganosiloxane-containing vinyl-based copolymer has a mass average particle diameter (Dw) of 110 to 250 nm, wherein a proportion of a particle having a particle diameter less than 100 nm is 20% by mass or less based on the total amount of the particle, and wherein a proportion of the particle having a particle diameter of 300 nm or more is 20% by mass or less based on the total amount of the particle.

[17] The graft copolymer (Gb) according to [15] or [16], wherein the polyorganosiloxane contains 0.5 to 3 parts by mass of a component derived from a siloxane-based cross-linking agent based on 100 parts by mass of organosiloxane.

[18] A thermoplastic resin composition (Ib) including the graft copolymer (Gb) according to any one of [15] to [17] and a thermoplastic resin (Hb) except for the graft copolymer (Gb).

[19] The thermoplastic resin composition (Ib) according to [18], wherein the thermoplastic resin (Hb) is a copolymer including 0 to 40% by mass of a vinyl cyanide-based monomer unit, 40 to 80% by mass of an aromatic vinyl-based monomer unit, and 0 to 60% by mass of another vinyl-based monomer unit whose monomer is copolymerizable with these monomers.

[20] A molded body obtained by molding the thermoplastic resin composition (Ib) according to [18] or [19].

[21] A method of producing a polyorganosiloxane latex, the method comprising a step of dropping an emulsion (B) comprising organosiloxane, an emulsifier, and water into a water-based medium (A) comprising water, an organic acid catalyst, and an inorganic acid catalyst; and a step of performing polymerization, wherein a total amount of the organic acid catalyst and the emulsifier is 0.5 to 6 parts by mass based on 100 parts by mass of the organosiloxane, wherein the pH of the water-based medium (A) measured at 25° C. is within the range of 0 to 1.2, and wherein the dropping rate of the emulsion (B) is a rate such that an amount of organosiloxane to be fed is 0.5 [parts by mass/min] or less when a total amount of organosiloxane to be used is 100 parts by mass.

[22] The method according to [21], wherein the total amount of the organic acid catalyst and the emulsifier is 0.5 to 6 parts by mass based on 100 parts by mass of organosiloxane, and the pH of the water-based medium (A) measured at 25° C. is within the range of 0 to 1.0.

[23] The method according to [21] or [22], wherein the dropping rate of the emulsion (B) is a rate such that the rate of organosiloxane to be fed is 0.5 parts by mass/min or less.

[24] The method according to [22] or [23], wherein the organic acid catalyst contains at least one or more selected from the group consisting of aliphatic sulfonic acids, aliphatic-substituted benzenesulfonic acids, and aliphatic-substituted naphthalenesulfonic acids.

Advantageous Effects of Invention

The present invention provides a variety of molded bodies (in particular, automobile parts, casings for a variety of electrical appliances, construction members and the like) having high weatherability, impact resistance, designability and the like; and a polyorganosiloxane latex and a graft copolymer as raw materials for these molded bodies.

DESCRIPTION OF EMBODIMENTS

Polyorganosiloxane Latex

In the polyorganosiloxane latex according to the present invention, the mass average particle diameter (Dw) of the polyorganosiloxane particle is 100 to 200 nm, and the ratio (Dw/Dn) of the mass average particle diameter (Dw) to the number average particle diameter (Dn) is 1.0 to 1.7. Since Dw and Dw/Dn are in these ranges, the molded body comprising a blend of the polyorganosiloxane-containing vinyl-based copolymer and the graft copolymer exhibits high brightness, color developability, and impact resistance. Dw is preferably 100 to 190 nm. Dw/Dn is preferably 1.0 to 1.3.

In the polyorganosiloxane latex, the standard deviation in the mass average particle diameter (Dw) of the polyorganosiloxane particle is preferably 0 to 80.

In the polyorganosiloxane particle in the polyorganosiloxane latex, preferably, the proportion of the particle having a particle diameter less than 50 nm is 5% by mass or less based on the total amount of the particle, and the proportion of the particle having a particle diameter of 300 nm or more is 20% by mass or less based on the total amount of the particle.

The polyorganosiloxane latex according to the present invention is produced, for example, by dropping an emulsion (B) including organosiloxane, an emulsifier, and water into a water-based medium (A) including water, an organic acid catalyst, and an inorganic acid catalyst, and performing polymerization. For a specific production condition, for example, the total amount of the organic acid catalyst and the emulsifier is 0.5 to 6 parts by mass based on 100 parts by mass of organosiloxane, the pH of the water-based medium (A) measured at 25° C. is within the range of 0 to 1.2, and the dropping rate of the emulsion (B) is a rate such that the amount of organosiloxane to be fed is 0.5 [parts by mass/min] or less when a total amount of organosiloxane to be used is 100 parts by mass.

The total amount of the organic acid catalyst and the emulsifier is preferably 0.8 to 6 parts by mass based on 100 parts by mass of organosiloxane. The pH of the water-based medium (A) measured at 25° C. is preferably within the range of 0.1 to 1.2, and preferably within the range of 0.5 to 1.2.

The water-based medium (A) used in the method of producing a polyorganosiloxane latex includes water, an organic acid catalyst, and an inorganic acid catalyst. Deionized water can be used for water above. The amount of water to be contained in the water-based medium (A) is preferably 60 to 300 parts by mass, and more preferably 60 to 100 parts by mass based on 100 parts by mass of organosiloxane contained in the emulsion (B) described later. When the amount of water to be contained in the water-based medium (A) is 60 parts by mass or more, increase in the viscosity of the latex to be obtained can be suppressed, and handling of the latex becomes easy. When the amount of water to be contained in the water-based medium (A) is 300 parts by mass or less, production with high productivity is enabled, and reduction in the concentration of the solid content in the latex to be obtained can be suppressed.

For the organic acid catalyst, sulfonic acids such as aliphatic sulfonic acids, aliphatic-substituted benzenesulfonic acids, and aliphatic-substituted naphthalenesulfonic acids are preferable. Aliphatic-substituted benzenesulfonic acids are more preferable because of their significant action to stabilize an organosiloxane latex. An aliphatic substituent for the aliphatic-substituted benzenesulfonic acids is preferably an alkyl group having 9 to 20 carbon atoms, and more preferably an n-dodecyl group having 12 carbon atoms.

Examples of the inorganic acid catalyst include mineral acids such as sulfuric acid, hydrochloric acid, and nitric acid. Among these, sulfuric acid is preferable. These may be used alone or in combination.

The amounts of these catalysts to be used are adjusted such that the pH at 25° C. of the water-based medium (A) falls within the range of 0 to 1.2 because the pH of the water-based medium (A) is an important factor to determine the particle diameter of polyorganosiloxane to be obtained. By adjusting the pH of the water-based medium (A) in the above range, polyorganosiloxane having a narrow particle diameter distribution can be obtained. The pH at 25° C. of the water-based medium (A) is preferably in the range of 0.5 to 1.2 because adjustment is easy.

The pH of the water-based medium (A) is an important factor to determine the particle diameter of polyorganosiloxane for the following reason. Organosiloxane existing in oil droplets of the emulsion (B) contacts with the acid catalyst to form silanol. Silanol dissolves in the aqueous phase, comes to a micelle of the organic acid catalyst and the emulsifier, and condensation reaction occurs. This reaction progresses simultaneously with the condensation reaction of organosiloxane in oil droplets. When the pH of the water-based medium (A) is sufficiently low, the generation rate of silanol becomes faster, the condensation reaction by silanol is accelerated, and the rate of the condensation reaction of organosiloxane in oil droplets becomes relatively slower. As a result, polyorganosiloxane having a narrow particle diameter distribution is formed. Meanwhile, when the pH of the water-based medium (A) is more than 1.2, the generation rate of silanol becomes slower, and progression of the condensation reaction of organosiloxane in oil droplets cannot be neglected. As a result, the particle diameter of polyorganosiloxane to be obtained is larger, and the particle diameter distribution is wider. By controlling the pH of the water-based medium (A) in the above range, polyorganosiloxane having a narrow particle diameter distribution can be obtained.

Such a pH of the water-based medium (A) can be adjusted by adjusting the contents of the organic acid catalyst and the inorganic acid catalyst. Here, the value of the pH to be used is a value obtained by measuring the water-based medium (A) at 25° C. with a pH meter (Model PH82: made by Yokogawa Electric Corporation) and correcting the measured value at pHs of 4.01 and 6.86 by two-point calibration.

The content of the organic acid catalyst in the water-based medium (A) is preferably 0.1 to 5.5% by mass, and more preferably 0.1 to 2.5% by mass. The content of the inorganic acid catalyst in the water-based medium (A) is preferably 0.5 to 2.0% by mass, and more preferably 1.3 to 2.0% by mass from the viewpoint of preventing decomposition, coloring, and the like of a resin by the inorganic acid catalyst remaining in the latex when an additive or the like for a resin is synthesized using the latex to be obtained as a raw material. The values of these contents are based on 100% by mass of the water-based medium (A). The water-based medium (A) can be obtained by properly mixing and stirring these components.

The emulsion (B) includes organosiloxane, an emulsifier, and water. For organosiloxane, both linear organosiloxanes and cyclic organosiloxanes can be used. Cyclic organosiloxanes are preferable because they have high polymerization stability and a high polymerization rate. For cyclic organosiloxanes, those having a 3- to 7-membered ring are preferable. Examples thereof can include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. These may be used alone or in combination.

For the above organosiloxanes, commercially available products such as DMC made by Shin-Etsu Chemical Co., Ltd. can be used.

For the emulsifier used for the emulsion (B), anionic emulsifiers or nonionic emulsifiers are preferable. Examples of the anionic emulsifiers include sodium alkylbenzene sulfonate, sodium alkyldiphenyl ether disulfonate, sodium alkyl sulfate, sodium polyoxyethylene alkyl sulfate, and sodium polyoxyethylene nonylphenyl ether sulfate.

Examples of the nonionic emulsifiers include polyoxyethylene alkyl ether, polyoxyethylene alkylene alkyl ether, polyoxyethylene distyrenated phenyl ether, polyoxyethylene tribenzyl phenyl ether, polyoxyethylene polyoxypropylene glycol and the like. These emulsifiers may be used alone or in combination.

The content of the emulsifier in the emulsion (B) needs to be such an amount that organosiloxane can be dispersed in fine oil droplets, the fine oil droplets can adequately contact with the organic acid catalyst contained in the water-based medium (A), and generation of silanol can be promoted. For the content of the emulsifier, the total amount of the emulsifier and the organic acid catalyst contained in the water-based medium (A) is in the range of 0.5 to 6 parts by mass based on 100 parts by mass of organosiloxane. When the content of the organic acid catalyst is reduced, the content of the emulsifier is competitively increased in order to adjust the total amount of these components within the range of 0.5 to 6 parts by mass. When the total amount of these components is 0.5 parts by mass or more based on 100 parts by mass of organosiloxane, the mass average particle diameter of the polyorganosiloxane to be obtained can be controlled to be 200 nm or less, and the particle diameter distribution can be narrowed. When the total amount of these components is 6 parts by mass or less based on 100 parts by mass of organosiloxane, the mass average particle diameter of the polyorganosiloxane to be obtained is 100 nm or more, and the particle diameter distribution is narrowed. The total amount of these components is preferably 0.8 to 6 parts by mass, and more preferably 0.8 to 3 parts by mass based on 100 parts by mass of organosiloxane.

Further, preferably, the amount of the organic acid catalyst is 0.3 to 5.5 parts by mass and the amount of the emulsifier is 0.5 to 5.7 parts by mass based on 100 parts by mass of organosiloxane.

For water used for the emulsion (B), deionized water can be used. The content of water in the emulsion (B) is preferably 10 times or less the mass of organosiloxane. When the content of water is 10 times or less the mass of organosiloxane, reduction in the concentration of polyorganosiloxane in the latex to be obtained can be suppressed. When a vinyl monomer is added to the polyorganosiloxane latex having a proper value of the concentration of polyorganosiloxane and graft polymerization is performed, a graft copolymer can be synthesized efficiently by one stage polymerization. When the polyorganosiloxane latex to be obtained is used as a coating material, increase in the drying time of the coating film can be suppressed.

The emulsion (B) can contain a siloxane-based crosslinking agent and/or a siloxane-based grafting agent. For these crosslinking agents and grafting agents, those having a siloxy group are preferable. By using the siloxane-based crosslinking agent, polyorganosiloxane having a crosslinking structure can be obtained. Examples of the siloxane-based crosslinking agent include trifunctional or tetrafunctional silane-based crosslinking agents such as trimethoxymethylsilane, triethoxyphenylsilane, tetramethoxysilane, tetraethoxysilane, tetra-n-propoxysilane, and tetrabutoxysilane. Among these, tetrafunctional crosslinking agents are preferable, and tetraethoxysilane is more preferable. The content of the crosslinking agent is preferably 0.1 to 30 parts by mass, more preferably 0.5 to 5 parts by mass, and most preferably 0.5 to 3 parts by mass based on 100 parts by mass of organosiloxane.

The siloxane-based grafting agent has a siloxy group and a functional group which is polymerizable with a vinyl monomer. By using a siloxane-based grafting agent, polyorganosiloxane having a vinyl monomer and a functional group which is polymerizable with the vinyl monomer can be obtained. For this reason, a vinyl monomer can be grafted to the polyorganosiloxane thus obtained by radical polymerization. Examples of the siloxane-based grafting agent include siloxane represented by formula (I).

$$RSiR^1_n(OR^2)_{(3-n)} \quad (I)$$

In formula (I), $R^1$ represents a methyl group, an ethyl group, a propyl group, or a phenyl group; $R^2$ represents an organic group in an alkoxy group, and examples thereof include a methyl group, an ethyl group, a propyl group, or a phenyl group; n represents 0, 1, or 2; R represents a group represented by formulas (I-1) to (I-4).

$$CH_2=C(R^3)-COO-(CH_2)_p- \quad (I-1)$$

$$CH_2=C(R^4)-C_6H_4- \quad (I-2)$$

$$CH_2=CH- \quad (I-3)$$

$$HS-(CH_2)_p- \quad (I-4)$$

In these formulas, $R^3$ and $R^4$ each represents hydrogen or a methyl group, and p represents an integer of 1 to 6.

Examples of the functional group represented by formula (I-1) include a methacryloyloxyalkyl group. Examples of siloxane having this group include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane.

Examples of the functional group represented by formula (I-2) include a vinylphenyl group and the like. Examples of siloxane having this group include vinylphenylethyldimethoxysilane.

Examples of siloxane having the functional group represented by formula (I-3) include vinyltrimethoxysilane and vinyltriethoxysilane.

Examples of the functional group represented by formula (I-4) include a mercaptoalkyl group. Examples of siloxane having this group include γ-mercaptopropyldimethyoxymethylsilane, γ-mercaptopropylmethoxydimethylsilane, γ-mercaptopropyldiethoxymethylsilane, γ-mercaptopropylethoxydimethylsilane, and γ-mercaptopropyltrimethoxysilane. These siloxane-based grafting agents may be used alone or in combination.

The content of the siloxane-based grafting agent is preferably 0.05 to 20 parts by mass based on 100 parts by mass of organosiloxane. The siloxane-based crosslinking agent and the siloxane-based grafting agent are preferably used in combination. 0.5 to 5 parts by mass of the siloxane-based crosslinking agent and 0.05 to 5 parts by mass of the siloxane-based grafting agent are preferably used in combination based on 100 parts by mass of organosiloxane.

Further, the emulsion (B) may contain a siloxane oligomer having a terminal blocking group if necessary. The siloxane oligomer having a terminal blocking group refers to a siloxane oligomer that has an alkyl group or the like at the terminal of the organosiloxane oligomer, and terminates polymerization of polyorganosiloxane.

Examples of the siloxane oligomer having a terminal blocking group include hexamethyldisiloxane, 1,3-bis(3- glycidoxypropyl)tetramethyldisiloxane, 1,3-bis(3-aminopropyl)tetramethyldisiloxane, and methoxytrimethylsilane.

The emulsion (B) can be prepared by an emulsion method of mixing organosiloxane, the emulsifier, and water described above, and stirring the mixture such that a shear force is applied thereto. For the stirrer, typical stirring apparatuses having a stirring blade and a tank can be used. Preferably, a high pressure emulsifying apparatus can be used. The high pressure emulsifying apparatus is an apparatus that stirs a raw material mixture at a high pressure, and emulsifies the mixture by applying a shear force. Examples thereof include a homogenizer. By using such a high pressure emulsifying apparatus, a stable emulsion can efficiently be generated.

The thus-obtained emulsion (B) is dropped into the water-based medium (A). Thereby, a polyorganosiloxane latex can be obtained. The temperature of the water-based medium (A) is preferably 60 to 100° C., and more preferably 80° C. or more. When the temperature of the water-based medium (A) is 60° C. or more, the acid catalyst can sufficiently dissociate, and contact with organosiloxane to generate silanol effectively. When the temperature of the water-based medium (A) is 100° C. or less, a high pressure polymerization facility is unnecessary.

When the total amount of organosiloxane to be used is 100 parts by mass, the dropping rate of the emulsion (B) is preferably a rate such that the amount of organosiloxane to be fed is 0.5 [parts by mass/min] or less, and more preferably 0.3 [parts by mass/min] or less. When the amount of organosiloxane to be fed is 0.5 [parts by mass/min] or less, generation of silanol can be accelerated, and progression of the condensation reaction of organosiloxane in a micelle containing no acid catalyst can be suppressed. As a result, polyorganosiloxane having a narrow particle diameter distribution is obtained.

When the total amount of organosiloxane to be used is 100 parts by mass, the dropping rate of the emulsion (B) is preferably a rate such that the amount of organosiloxane to be fed is 0.05 [parts by mass/min] or more, and more preferably 0.08 [parts by mass/min] or more. When the amount of organosiloxane to be fed is 0.05 [parts by mass/min] or more, reduction in productivity can be suppressed.

The emulsion (B) is preferably dropped at a temperature of 60 to 100° C. for 3 to 34 hours. This operation can efficiently progress the reaction.

After dropping of the emulsion (B) is completed, further, heating is preferably performed. Heating can be performed for 2 to 50 hours, for example. By heating after dropping, silanol derived from organosiloxane can almost completely be reacted.

Further, because the crosslinking reaction between silanol progresses at a temperature of 30° C. or less, the temperature of 30° C. or less can be kept for approximately 5 to 100 hours in order to increase the crosslinked density of polyorganosiloxane.

The condensation reaction for polyorganosiloxane can be terminated by neutralizing the latex with an alkaline substance such as sodium hydroxide, potassium hydroxide, and an aqueous ammonia solution to a pH of 6 to 8.

The thus-obtained polyorganosiloxane has a mass average particle diameter (Dw) in the range of 100 to 200 nm and a narrow particle diameter distribution at Dw/Dn of 1.7 or less. By adjusting the total amount of the organic acid catalyst and the emulsifier in the range of 0.8 to 6 parts by mass based on 100 parts by mass of organosiloxane, the mass average particle diameter of polyorganosiloxane can be adjusted to have a desired value in the range of 100 to 200 nm.

For the particle diameter of polyorganosiloxane, a value obtained by measurement by the following method can be used. The polyorganosiloxane latex is diluted with deionized water to have a concentration of approximately 3%, and the obtained product is used as a sample. The particle diameter is measured using a CHDF2000 type particle size distribution analyzer made by MATEC Instrument Companies, Inc., U.S.A.

The measurement can be performed on the standard condition recommended by MATEC Instrument Companies, Inc. as below:

cartridge: dedicated capillary cartridge for separating particles (trade name; C-202), carrier solution: dedicated carrier solution (trade name; 2XGR500), solution properties of the carrier solution: almost neutral, flow rate of the carrier solution: 1.4 ml/min, pressure of the carrier solution: approximately 4,000 psi (2,600 kPa), measurement temperature: 35° C., amount of the sample to be used: 0.1 ml.

Among monodisperse polystyrenes made by Duke Scientific Corporation, U.S.A. and having a known particle diameter, those having 12 different particle diameters in total in the range of 40 to 800 nm are used as the standard particle diameter substance.

To improve mechanical stability, an emulsifier may be added to the polyorganosiloxane latex obtained by the above method if necessary. The same anionic emulsifiers and nonionic emulsifiers as those listed above are preferable.

The amount of the emulsifier to be added is preferably 0.05 to 10 parts by mass based on 100 parts by mass of organosiloxane. When the amount is 0.05 parts by mass or more, the mechanical stability of the latex is improved. When the amount is 10 parts by mass or less, occurrence of coloring can be suppressed in the additive for a resin obtained using the polyorganosiloxane latex as a raw material.

The polyorganosiloxane latex according to the present invention is suitably used as a raw material for an impact strength modifier for a resin. The polyorganosiloxane latex according to the present invention is suitable for a variety of applications such as a variety of cosmetics such as hair cosmetics, skin cosmetics, and make-up cosmetics; lustering agents and surface protecting agents for automobiles, furniture, leather products, and the like; surface treatment agents for improving lubrication of weather strips and the like; fiber treatment agents for cloths, curtains, bedcloths, and the like; antifoaming agents used for waste water treatments and production of foods.

The impact strength modifier for a resin using the polyorganosiloxane latex according to the present invention is, in particular, useful because a material having a narrow particle diameter distribution and a good balance between impact strength and the surface appearance can be provided.

[Polyorganosiloxane-Containing Vinyl-Based Copolymer]

The polyorganosiloxane-containing vinyl-based copolymer according to the present invention is a copolymer obtained by polymerizing one or more vinyl-based monomers in the presence of the polyorganosiloxane latex wherein the mass average particle diameter (Dw) is 100 to 200 nm and wherein the ratio (Dw/Dn) of the mass average particle diameter (Dw) to the number average particle diameter (Dn) is 1.0 to 1.7.

The polyorganosiloxane-containing vinyl-based copolymer (hereinafter, referred to as a "composite polymer (g)" in some cases) preferably has a mass average particle diameter (Dw) of 110 nm to 800 nm, and the ratio (Dw/Dn) of the mass average particle diameter (Dw) to the number average particle diameter (Dn) of 1.0 to 2.0.

A vinyl-based monomer usable to obtain the composite polymer (g) is not in particular limited, and examples thereof include (meth)acrylic acid ester-based monomers, aromatic vinyl monomers, and vinyl cyanide monomers.

Examples of the (meth)acrylic acid ester-based monomers include methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, and 2-ethylhexyl (meth)acrylate. Examples of the aromatic vinyl monomers include styrene, α-methylstyrene, vinyltoluene, and chlorostyrene. Examples of the vinyl cyanide monomers include acrylonitrile and methacrylonitrile. These vinyl-based monomers can be used alone or in combination. Among these vinyl-based monomers, acrylic acid ester-based monomers are preferably used.

For the polymerizable component, a grafting agent and a crosslinking agent can also be used if necessary. Examples of the grafting agent or crosslinking agent include polyfunctional monomers such as allyl methacrylate, triallyl cyanurate, triallyl isocyanurate, divinylbenzene, ethylene glycol diester dimethacrylate, propylene glycol diester dimethacrylate, 1,3-butylene glycol diester dimethacrylate, 1,4-butylene glycol diester dimethacrylate, 1,6-hexane diol diacrylic acid ester, and triallyl trimellitate. These can be used alone or in combination.

The method of producing the composite polymer (g) is not in particular limited. The composite polymer (g) can be produced, for example, by an emulsion polymerization method, a suspension polymerization method, or a micro-suspension polymerization method. Use of the emulsion polymerization method is preferable. Among these, a method of emulsion polymerizing one or more vinyl-based monomers in the presence of the polyorganosiloxane latex to obtain a latex of the composite polymer (g) is in particular preferable.

Examples of a method of adding a vinyl-based monomer to the polyorganosiloxane latex include a method of adding a vinyl-based monomer into the polyorganosiloxane latex in a lump sum or dropwise.

In production of the latex of the composite polymer (g), an emulsifier can be added to stabilize the latex and control the average particle diameter of the composite polymer. The emulsifier is not in particular limited, and anionic emulsifiers and nonionic emulsifiers are preferable.

Examples of the anionic emulsifiers include a variety of carboxylic acid salts such as sodium sarcosinate, fatty acid potassium, fatty acid sodium, dipotassium alkenyl succinate, and rosin acid soap; sulfonic acid salts such as sodium alkylbenzene sulfonate and sodium diphenylether disulfonate, sulfuric acid salts such as sodium alkyl sulfate, sodium polyoxyethylene alkyl sulfate, and sodium polyoxyethylene nonylphenyl ether sulfate; and phosphoric acid salts such as sodium polyoxyethylene alkyl phosphate and calcium polyoxyethylene alkyl phosphate.

Examples of the nonionic emulsifiers include polyoxyethylene alkyl ether, polyoxyethylene distyrenated phenyl ether, and polyoxyethylene tribenzylphenyl ether. These emulsifiers can be used alone or in combination.

By adjusting the amounts of the emulsifier and the vinyl-based monomer, a composite polymer (g) having Dw of 110 to 800 nm and Dw/Dn of 1.0 to 2.0 can be produced. The amount of the emulsifier is preferably 0.1 to 20 parts by mass based on 100 parts by mass of the polyorganosiloxane latex.

Examples of the polymerization initiator used for polymerization of the vinyl-based monomer include peroxides, azo-based initiators, or redox type initiators in combination of an oxidizing agent with a reducing agent. Among these, the redox type initiators, in particular, combinations of redox type initiators using ferrous sulfate, ethylenediaminetetraacetic acid disodium salt, a reducing agent and peroxide are preferable.

Examples of the peroxide include organic peroxides such as diisopropylbenzene hydroperoxide, p-menthane hydroperoxide, cumene hydroperoxide, and t-butyl hydroperoxide. These can be used alone or in combination. Examples of the reducing agent include sodium formaldehyde sulfoxylate, L-ascorbic acid, fructose, dextrose, sorbose, and inositol. These can be used alone or in combination.

For the mass ratio of the polyorganosiloxane and vinyl-based polymer in the composite polymer (g) (100% by mass), preferably, polyorganosiloxane is 1.0 to 99.0% by mass and the vinyl-based polymer is 99.0 to 1.0% by mass. The mass ratio can be calculated from the mass ratio of polyorganosiloxane to the vinyl-based monomer, the grafting agent, and the crosslinking agent used in production of the composite polymer (g).

The composite polymer (g) can be recovered as a powder from the latex of the composite polymer (g). The latex of the composite polymer (g) can be used as a raw material for the graft copolymer (G) described later.

When the powder of the composite polymer (g) is recovered from the latex of the composite polymer (g), one of a spray drying method and a coagulation method can be used.

The spray drying method is a method in which the latex of the composite polymer (g) is sprayed in a dryer in a form of micro liquid droplets, and these droplets are dried by applying a heated gas for drying. Examples of a method for generating micro liquid droplets include a rotary disk method, a pressure nozzle method, a two-fluid nozzle method, and a pressurized two-fluid nozzle method. The dryer may have a small volume for use in a laboratory, or a large volume for industrial use. The temperature of the heated gas for drying is preferably 200° C. or less, and more preferably 120 to 180° C. The latexes of two or more composite polymers (g) individually produced can also be spray dried together. Further, to improve powder properties such as blocking during spray drying and bulk specific gravity, optional component such as silica can also be added to a polymer latex and spray drying can be performed.

The coagulation method is a method in which the latex of the composite polymer (g) is put into very hot water in which calcium chloride, calcium acetate, aluminum sulfate, or the like is dissolved; the composite polymer (g) is separated by salting-out and coagulation; next, the separated wet composite polymer (g) is dehydrated to reduce the content of water, and recovered; further, the recovered composite polymer (g) is dried using a squeeze dehydrator or a hot air dryer.

Examples of a coagulant used in coagulation of the composite polymer (g) from the latex include inorganic salts such as aluminum chloride, aluminum sulfate, sodium sulfate, magnesium sulfate, sodium nitrate, and calcium acetate and acids such as sulfuric acid. These coagulants may be used alone or in combination. When these are used in combination, a combination that does not allow formation of a water-insoluble salt is required. For example, if calcium acetate is used in combination with sulfuric acid or a sodium salt thereof, a water-insoluble calcium salt is formed. This combination is not preferable.

The above coagulant is usually used in a form of an aqueous solution. The concentration of the coagulant aqueous solution is 0.1% by mass or more, and in particular preferably 1% by mass or more from the viewpoint of stably coagulating and recovering the composite polymer (g). The concentration of the coagulant aqueous solution is 20% by mass or less, and in particular preferably 15% by mass or less from the viewpoint of reducing the amount of the coagulant remaining in the recovered composite polymer (g) and thereby suppressing coloring of the molded article. The amount of the coagulant aqueous solution is not in particular limited. The amount is 10 parts by mass or more, and preferably 500 parts by mass or less based on 100 parts by mass of the latex.

The method of contacting the latex with the coagulant aqueous solution is not in particular limited. Examples thereof usually include a method in which while the coagulant aqueous solution is stirred, the latex is continuously added thereto and the solution is kept for a predetermined period of time, and a method in which the coagulant aqueous solution is contacted with the latex while these materials are continuously charged into a container having a stirrer at a predetermined ratio; and a mixture of a flocculated polymer and water is continuously extracted from the container. The temperature when the latex contacted with the coagulant aqueous solution is not in particular limited. The temperature is 30° C. or more, and preferably 100° C. or less. The time for the contact is not in particular limited.

The flocculated composite polymer (g) is washed with water approximately 1 to 100 times the mass thereof. The filtered wet composite polymer (g) is dried using a fluidized bed dryer, a squeeze dehydrator, or the like. The temperature and the time for drying may be properly determined depending on the composite polymer (g) to be obtained. Without recovering the composite polymer (g) discharged from a squeeze dehydrator or an extruder, the composite polymer (g) may directly be sent to an extruder or a molding machine that produces a resin composition, and may be mixed with other thermoplastic resins to obtain a molded body.

[Graft Copolymer (G)]

A graft copolymer (G) according to the present invention is a graft copolymer obtained by graft polymerizing one or more vinyl-based monomers in the presence of the polyorganosiloxane-containing vinyl-based copolymer. A composite polymer (g) according to the present invention can be used as a raw material for a graft copolymer (G). Examples of the graft polymerization method include a method of polymerizing a vinyl-based monomer (hereinafter, referred to as a "monomer for grafting" in some cases) in the presence of the latex of the composite polymer (g). By performing polymerization using the same method as that in production of the latex of the composite polymer (g) described above, the latex of the graft copolymer (G) can be obtained.

For the monomer for grafting, the same (meth)acrylic acid ester-based monomers, aromatic vinyl monomers, and vinyl cyanide monomers as those described in production of the composite polymer (g) are preferable.

Examples of the graft polymerization method include a method in which the monomer for grafting is fed into the latex of the composite polymer (g), and polymerization is performed at one or multi stages. Specifically, examples thereof include a batch polymerization method of feeding the total amount of the monomer for grafting at one time and a consecutive polymerization method of feeding the monomer for grafting by continuously dropping the monomer for grafting (hereinafter, referred to as a "semi-batch polymerization method"). As an intermediate operation, a method in which the monomer for grafting is divided into portions having a small amount, and an operation of "feeding a small amount of the monomer for grafting and polymerization" is repeated at many stages can be used. The semi-batch polymerization method is preferable because the stability during polymerization is high and a latex having a desired particle diameter and particle diameter distribution can be obtained.

Examples of the emulsifier used in graft polymerization include the same emulsifiers as those described in production of the composite polymer (g). The anionic emulsifiers and nonionic emulsifiers are preferable.

Examples of the polymerization initiator used in the graft polymerization include the same polymerization initiators used in production of the composite polymer (g). In particular, polymerization initiators in combination of ferrous sulfate, ethylenediaminetetraacetic acid disodium salt, a reducing agent, and peroxide are preferably used.

When powders of a graft copolymer (G) is recovered from the latex of the graft copolymer (G), one of the spray drying method and the coagulation method can be used similarly in the case of recovering powders of the composite polymer (g).

Examples of preferable embodiments of the graft copolymer (G) according to the present invention include graft copolymers (Ga) and (Gb) described later. Examples of preferable embodiments of the composite polymer (g) according to the present invention include composite polymers (ga) and (gb) described later.

[Graft Copolymer (Ga)]

A graft copolymer (G) according to the present invention is preferably a graft copolymer (Ga), wherein a molded body obtained by molding the following composition exhibits the following performance (1) and (2) when evaluated under the following measurement conditions:

(1) a Charpy impact strength at 23° C. is 6 kJ/m$^2$ or more, and (2) a diffuse reflectance is 5% or less.

<Test Piece Production Condition>

(a) 33 parts by mass of a graft copolymer (G), (b) 9 parts by mass of an acrylonitrile.styrene copolymer including 25% by mass of an acrylonitrile unit and 75% by mass of a styrene unit and having a reduced viscosity ($\eta$sp/c) of 0.40 dL/g in an N,N-dimethylformamide solution of 0.2 g/dL at 25° C., (c) 9 parts by mass of an acrylonitrile-styrene copolymer including 28% by mass of an acrylonitrile unit and 72% by mass of a styrene unit and having a reduced viscosity of 0.62 dL/g in an N,N-dimethylformamide solution of 0.2 g/dL at 25° C., (d) 50 parts by mass of an acrylonitrile-styrene-N-phenylmaleimide copolymer including 22% by mass of an acrylonitrile unit, 55% by mass of a styrene unit, and 23% by mass of an N-phenylmaleimide unit and having a reduced viscosity of 0.66 dL/g in an N,N-dimethylformamide solution of 0.2 g/dL at 25° C., (e) 0.5 parts by mass of ethylenebisstearylamide, (f) 0.03 parts by mass of silicone oil, and (g) 0.05 parts by mass of carbon black.

These seven materials (a) to (g) above are blended, and kneaded using a volatilizing extruder (TEX-30α made by The Japan Steel Works, Ltd.) whose barrel is heated to a temperature of 260° C. to obtain pellets. The pellets are molded using a 4-ounce injection molding machine (made by The Japan Steel Works, Ltd.) in conditions of a cylinder temperature of 260° C. and a mold temperature of 60° C. to obtain a test piece 1 (a length of 80 mm, a width of 10 mm and a thickness of 4 mm). Moreover, a plate-like molded body 2 (a length of 100 mm, a width of 100 mm and a thickness of 2 mm) is obtained in the same manner as above in conditions of a cylinder temperature of 260° C., a mold temperature of 60° C., and an injection rate of 5 g/sec.

<Charpy Impact Strength Measurement Condition>

Measurement is conducted on a V-notched test piece 1 that is left under a 23° C. atmosphere for 12 hours or more by a method according to ISO 179.

<Diffuse Reflectance Measurement Condition>

A 50 nm aluminum film is formed (through a direct deposition) on the surface of the molded body 2 by a vacuum deposition method (VPC-1100 made by ULVAC-PHI, Inc.) in conditions of a degree of vacuum of $6.0 \times 10^{-3}$ Pa and a film forming rate of 10 angstroms/sec. A diffuse reflectance (%) of the obtained molded body is measured using a reflectance meter (TR-1100AD made by Tokyo Denshoku Co., Ltd.).

A composite polymer (g) according to the present invention is preferably a composite polymer (ga) which contains 5 to 25% by mass of polyorganosiloxane and has a mass average particle diameter (Dw) of 120 to 200 nm, in which a proportion of the particle having a particle diameter of 100 nm or less is 15% by mass or less based on the total amount of the particle, and in which a proportion of the particle having the particle diameter of 400 nm or more is 1% by mass or less based on the total amount of the particle. A graft copolymer (Ga) according to the present invention is preferably a copolymer obtained by graft polymerizing a mixture of a vinyl cyanide-based monomer and an aromatic vinyl-based monomer with the composite polymer (ga).

A molded body obtained from the graft copolymer (Ga) preferably has performances as below:

(1') A Charpy impact strength at 23° C. is 6 kJ/m² or more, and 50 kJ/m² or less, and (2') A diffuse reflectance is 0.1% or more, and 5% or less.

The polyorganosiloxane that forms the composite polymer (ga) preferably contains 0.5 to 5 parts by mass of a component derived from a siloxane-based crosslinking agent based on 100 parts by mass of organosiloxane.

The vinyl-based polymer that forms the composite polymer (ga) is an acrylic acid ester monomer, or an acrylic acid ester-based polymer obtained by polymerizing a monomer mixture containing one or more acrylic acid ester monomers.

Examples of the acrylic acid ester-based monomers include methyl acrylate, ethyl acrylate, n-propyl acrylate, n-butyl acrylate, and 2-ethylhexyl acrylate. These can be used alone or in combination. Among these, n-butyl acrylate is preferable because the molded body obtained from the resin composition has high impact resistance.

For the polymerizable component, a grafting agent and a crosslinking agent can be used if necessary. For the grafting agent and the crosslinking agent, the same polyfunctional monomers as those used in production of the composite polymer (g) can be used. These may be used alone or in combination. The amount of the grafting agent and crosslinking agent to be added may be properly determined. From the viewpoint of a good balance between the impact resistance of the molded body and brightness after direct deposition, the amount is preferably 0.1 to 5 parts by mass, more preferably 0.2 to 2 parts by mass, and in particular preferably 0.4 to 1.0 part by mass based on 100 parts by mass of the acrylic acid ester-based monomer (including a mixture). A smaller amount is preferable from the viewpoint of impact resistance, and a larger amount is preferable from the viewpoint of brightness.

A method of producing the composite polymer (ga) is not in particular limited. A method of mixing a polyorganosiloxane latex with an acrylic acid ester-based polymer latex and heteroaggregating or co-enlarging of particles in the mixture may be used, or the same method as that used in production of the composite polymer (g) described above may be used. At this time, the monomer may be a mixture. Among these, a method of polymerizing an acrylic acid ester-based monomer in the presence of the polyorganosiloxane latex is preferable from the viewpoint of the impact resistance of the molded body, the brightness of the molded body after direct deposition and appearance of welding portion.

For the content of the acrylic acid ester-based polymer derived from polyorganosiloxane and the acrylic acid ester-based monomer, in the composite polymer (ga), preferably, the content of polyorganosiloxane is 5 to 25% by mass and the content of acrylic acid ester-based polymer is 95 to 75% by mass from the viewpoint of high impact resistance of the molded body and remarkable brightness of the molded body after direct deposition. The content of polyorganosiloxane is more preferably 7 to 20% by mass, and in particular preferably 9 to 16% by mass. As the content of polyorganosiloxane reduces, impact resistance tends to reduce. As the content of polyorganosiloxane increases, brightness after direct deposition tends to reduce.

The mass average particle diameter (Dw) of the composite polymer (ga) particle is 120 nm to 200 nm from the viewpoint of high impact resistance of the molded body and remarkable brightness of the molded body after direct deposition. As the mass average particle diameter reduces, impact resistance of the molded body tends to reduce. As the mass average particle diameter increases, brightness of the molded body after direct deposition tends to reduce.

In order to obtain a molded body having a high level brightness after direct deposition, the proportion of the composite polymer particle having a particle diameter of 100 nm or less is preferably 15% by mass or less, more preferably 10% by mass or less, and still more preferably 5% by mass or less, in 100% by mass of the composite polymer (ga). From the viewpoint of a molded body having remarkable brightness after direct deposition, the proportion of the composite polymer particle having a particle diameter of 400 nm or more is 1% by mass or less.

The mass average particle diameters (Dw) of a composite polymer (ga) and a graft copolymer (G) to be used are a value measured by the following method. Using a Nanotrac UPA-EX150 made by NIKKISO CO., LTD., the particle size distribution in the latex of the composite polymer (ga) and the latex of the graft copolymer (G) is measured by the dynamic light scattering method. From the obtained particle size distribution, the mass average particle diameter, the proportion of the particle having a particle diameter of 100 nm or less, and the proportion of the particle having a particle diameter of 400 nm or more are calculated.

In order to obtain a composite polymer (ga) having a mass average particle diameter of 120 to 200 nm and a graft copolymer (G), the particle diameter of polyorganosiloxane may be adjusted. The mass average particle diameter (Dw) of polyorganosiloxane is preferably 100 nm to 150 nm, and Dw/Dn is preferably 1.00 to 1.70.

The monomer for grafting is not in particular limited. Examples thereof include the same aromatic vinyl-based monomers, (meth)acrylic acid ester-based monomers, and vinyl cyanide-based monomers as those used in the case of the composite polymer (g) described above.

Examples of the aromatic vinyl-based monomers include styrene, α-methylstyrene, and vinyltoluene. Examples of the (meth)acrylic acid ester-based monomers include methyl methacrylate, ethyl methacrylate, 2-ethylhexyl methacrylate, methyl acrylate, ethyl acrylate, and butyl acrylate. Examples of the vinyl cyanide-based monomers include acrylonitrile and methacrylonitrile. These vinyl-based monomers can be used alone or in combination. Among these, use of the aromatic vinyl-based monomer in combination with the vinyl cyanide-based monomer is preferable, and use of styrene in combination with acrylonitrile is in particular preferable from the viewpoint of high impact resistance of the molded body.

When an aromatic vinyl compound is used in combination with a vinyl cyanide compound, preferably 20 to 40% by mass of the vinyl cyanide-based monomer and 80 to 60% by mass of the aromatic vinyl-based monomer are contained, and more preferably 25 to 35% by mass of the vinyl cyanide-based monomer and 75 to 65% by mass of the aromatic vinyl-based monomer are contained, in 100% by mass of a monomer mixture for grafting. As the content of the vinyl cyanide-based monomer reduces, impact resistance tends to reduce. As the content increases, fluidity tends to reduce.

The mass ratio of a composite polymer (ga) to a monomer mixture for grafting as raw materials is not in particular limited. From the viewpoint of high impact resistance of the molded body, high fluidity, and remarkable brightness after direct deposition, preferably the ratio of the composite polymer (ga) is 20 to 80% by mass and the ratio of the monomer for grafting is 80 to 20% by mass, and in particular preferably the ratio of the composite polymer (ga) is 40 to 70% by mass and the ratio of the monomer for grafting is 60 to 30% by mass. As the content of the composite polymer (ga) reduces, impact resistance tends to reduce. As the content of the composite polymer (ga) increases, brightness after direct deposition tends to reduce.

Examples of the graft polymerization method include the same method as those used in production of the composite polymer (ga) described above. Among these, emulsion polymerization is suitable. Examples of the emulsifier include the same as those used in production of the composite polymer (ga) described above. The following are preferable from the viewpoint of high stability of the latex during emulsion polymerization and increase in the polymerization rate: a variety of carboxylic acid salts such as sodium sarcosinate, fatty acid potassium, fatty acid sodium, dipotassium alkenyl succinate, and rosin acid soap; and anionic emulsifiers such as alkyl sulfuric acid ester, sodium alkylbenzene sulfonate, and sodium dodecyldiphenyl ether disulfonate. These are used according to the purpose. Without using an emulsifier during graft polymerization, the emulsifier used in production of polyorganosiloxane or the composite polymer (ga) can be used as it is.

The emulsifiers listed here are also suitable for polymerization of the acrylic acid ester-based polymer that forms the composite polymer (ga).

Examples of the radical polymerization initiator used in graft polymerization include the same as the polymerization initiators used in production of the composite polymer (ga) described above. In particular, use of ferrous sulfate, ethylenediaminetetraacetic acid disodium salt, a reducing agent and peroxide in combination is preferable. The radical polymerization initiators listed are also suitable in polymerization for the acrylic acid ester-based polymer that forms the composite polymer (ga).

In order to control the graft rate and the molecular weight of the graft component, for example, a variety of chain transfer agents such as mercaptan-based compounds, terpene-based compounds, and α-methylstyrene dimers can be used. The polymerization condition is not in particular limited, and can properly be set if necessary.

When powders of a graft copolymer (Ga) is recovered from the latex of the graft copolymer (Ga), one of the spray drying method and the coagulation method can be used similarly in the case of recovering the powder of the composite polymer (ga) above. Use of the coagulation method is preferable.

A graft copolymer (Ga) according to the present invention can be used for a thermoplastic resin composition (Ia) by mixing the graft copolymer (Ga) with a thermoplastic resin (Ha) except for the graft copolymer (Ga).

[Thermoplastic Resin Composition (Ha)]

A thermoplastic resin (Ha) is not in particular limited, and examples thereof include the following: acrylic (Ac) resins such as PMMA resins; styrene-based resins such as polystyrene (PSt), acrylonitrile-styrene copolymers (AS resins), acrylonitrile-α-methylstyrene copolymers (α-SAN resins), styrene-maleic anhydride copolymers, acrylonitrile-styrene-N-substituted maleimide ternary copolymers, acrylonitrile-styrene-α-methylstyrene-N-substituted maleimide quaternary copolymers, styrene-maleic anhydride-N-substituted maleimide ternary copolymers, methyl methacrylate-styrene copolymers (MS resins), and acrylonitrile-styrene-methyl methacrylate copolymers; PC resins; polyester-based resins such as polybutylene terephthalate (PBT resins), polyethylene terephthalate (PET resins), and polyethylene naphthalate (PEN resins); polyvinyl chloride; modified polyphenylene ether (modified PPE resins); and polyamides.

The following can also be used: polyolefins such as polyethylene and polypropylene; styrene-based elastomers such as styrene-butadiene-styrene (SBS), styrene-butadiene (SBR), hydrogenated SBS, and styrene-isoprene-styrene (SIS); a variety of olefin-based elastomers; a variety of polyester-based elastomers; polyacetal resins; ethylene-vinyl acetate copolymers; PPS resins; PES resins; PEEK resins; polyarylate; and liquid crystal polyester resins.

These thermoplastic resins (Ha) can be used alone or in combination. Among these, styrene-based resins are preferable, AS resins, α-SAN resins, and copolymers made from vinyl cyanide-based monomer, aromatic vinyl-based monomer and N-substituted maleimide are more preferably used, and styrene-based resins including a copolymer including 0 to 40% by mass of a vinyl cyanide-based monomer unit, 40 to 80% by mass of an aromatic vinyl-based monomer unit, and 0 to 60% by mass of another monomer unit whose monomer is copolymerizable with these monomers, such as N-substituted maleimide, are still more preferable from the viewpoint of remarkable brightness after direct deposition, high impact resistance, high heat plate welding properties, and high vibration welding properties of the molded body produced from the thermoplastic resin composition (Ia). For the vinyl cyanide-based monomer, acrylonitrile is preferable. For the aromatic vinyl-based monomer, styrene and/or α-methylstyrene is preferable.

When an AS resin or α-SAN resin is used, the composition in particular preferably includes 20 to 35% by mass of the vinyl cyanide-based monomer unit, and 65 to 80% by mass of the aromatic vinyl-based monomer unit. Examples of copolymers made from vinyl cyanide-based monomer, aromatic vinyl-based monomer and N-substituted maleimide include acrylonitrile-styrene-N-substituted maleimide ternary copolymers and acrylonitrile-styrene-α-methylstyrene-N-substituted maleimide quaternary copolymers. When these copolymers made from vinyl cyanide-based monomer, aromatic vinyl-based monomer and N-substituted maleimide are used, the composition of the copolymers in particular preferably includes 0 to 35% by mass of a vinyl cyanide-based monomer unit, 40 to 70% by mass of an aromatic vinyl-based monomer unit, and 5 to 60% by mass of an N-substituted maleimide unit. For the vinyl cyanide-based monomer, acrylonitrile is preferable. For the aromatic vinyl-based monomer, styrene and/or α-methylstyrene is preferable.

[Thermoplastic Resin Composition (Ia)]

A thermoplastic resin composition (Ia) according to the present invention is a composition having a graft copolymer (Ga) and a thermoplastic resin (Ha) blended. For the content in the thermoplastic resin composition (Ia), preferably, the content of the graft copolymer (Ga) is 10 to 50% by mass and the content of the thermoplastic resin (Ha) is 90 to 50% by mass. More preferably, the content of the graft copolymer (Ga) is 20 to 45% by mass and the content of the thermoplastic resin (Ha) is 80 to 55% by mass. By blending the graft copolymer (Ga) with the thermoplastic resin (Ha) at such mass ratio, the molded body has remarkable brightness after direct deposition, high impact resistance, high heat plate welding properties, and high vibration welding properties. As the content of the graft copolymer (Ga) reduces, impact resistance and heat plate welding properties tend to reduce. As the content of the graft copolymer (Ga) increases, brightness after direct deposition and vibration welding properties tend to reduce.

In addition to the graft copolymer (Ga) and the thermoplastic resin (Ha), additives such as dyes, pigments, a stabilizer, a reinforcing agent, a filler, a flame retardant, a foaming agent, a lubricant, a plasticizer, an antistatic agent, a weather proofing agent, and a UV absorber can be blended with the thermoplastic resin composition (Ia) if necessary.

The method of preparing the thermoplastic resin composition (Ia) is not in particular limited. Using a V type blender, a Henschel mixer, or the like, the graft copolymer (Ga), the thermoplastic resin (Ha), and a variety of additives to be used if necessary, are mixed and dispersed. The mixture is melt kneaded using a kneader such as an extruder, a Banbury mixer, a pressure kneader, and a roll. Thus, the thermoplastic resin composition (Ia) can be prepared.

[Molded Body]

By molding the thermoplastic resin composition (Ia), a variety of molded bodies are obtained. Examples of the molded body include the following: vehicle parts, in particular a variety of exterior parts and interior parts such as front grilles used with no paint; construction material parts such as wall materials and window frames; eating utensils; toys; home appliance parts such as housings of vacuum cleaners, housings of televisions, and housings of air conditioners; interior members, ship members, and housings of electrical apparatuses such as housings of communication apparatuses, housings of notebook type personal computers, housings of mobile terminals, and housings of liquid crystal projectors. Among these, a suitable molded body is obtained by the thermoplastic resin composition (Ia) in the vehicle parts, in particular, lamp housings, obtained by performing metallization treatment on the surface of the molded body by the direct deposition method.

The molding method is not in particular limited. Known various molding methods such as an injection molding method, an extrusion molding method, a blow molding method, a compression molding method, a calender molding method, and an inflation molding can be used. Among these, in particular, the injection molding method is preferable.

The surface of the molded body according to the present invention subjected to a primary process by the above variety of molding methods can be subjected to metallization treatment by a direct deposition method. Namely, without performing a special pre-treatment such as formation of an undercoat treatment layer, a metallic layer of aluminum, chromium, or the like can be formed directly on the surface of the molded body by a vacuum deposition method or a sputtering method. The bright surface subjected to metallization treatment may be left as it is. Further, to protect the surface against scratches caused by dust or the like, the surface can be subjected to a top coat treatment to form a silicon-based coating film or the like.

According to the thermoplastic resin composition of the present invention, by using the above configuration, a molded body having high mechanical strength such as impact resistance and weatherability, exhibiting a remarkable beautiful bright appearance after direct deposition, and having high heat plate welding properties for transparent resins and vibration welding properties is obtained.

[Lamp Housing for Vehicle Lighting]

A lamp housing for vehicle lighting is an integrally formed product which is obtained by bonding a molded body according to the present invention to a resin lens made of a transparent resin such as PMMA resins and PC resins by a method such as a heat plate welding method, a vibration welding method, and a laser welding method. The surface of the molded body can be subjected to metallization treatment by a direct deposition method. A necessary member is optionally mounted on the molded body. The lamp housing has high mechanical strength such as impact resistance and weatherability, and a good appearance. The lamp housing according to the present invention can be suitably used for automobiles and the like.

Next, an example of a preferable aspect of the graft copolymer (G) according to the present invention, that is, a graft copolymer (Gb) and an example of a preferable aspect of the composite polymer (g) according to the present invention, that is, a composite polymer (gb) will be described.

[Graft Copolymer (Gb)]

A graft copolymer (G) according to the present invention is preferably a graft copolymer (Gb), wherein a molded body obtained by molding the following composition exhibits the following performance (1) and (2) when evaluated under the following measurement conditions:

(1) $L^*$ is 24 or less, and
(2) a Charpy impact strength at $-30°$ C. is 6 $kJ/m^2$ or more.

<Test Piece Production Condition>

(a) 42 Parts by mass of a graft copolymer (Gb),
(b) 58 parts by mass of an acrylonitrile-styrene copolymer including 34% by mass of an acrylonitrile unit and 66% by mass of a styrene unit and having a reduced viscosity ($\eta sp/c$) of 0.62 dL/g in an N,N-dimethylformamide solution of 0.2 g/dL at 25° C.,
(c) 0.3 parts by mass of ethylenebisstearylamide, and
(d) 0.5 parts by mass of carbon black.

These four materials (a) to (d) above are blended, and kneaded using a volatilizing extruder (made by Ikegai Corp., PCM-30) whose barrel is heated to a temperature of 230° C. to obtain pellets. The pellets are molded using a fl-ounce injection molding machine (made by The Japan Steel Works, Ltd.) in conditions of a cylinder temperature of 230° C. and a mold temperature of 60° C. to obtain a test piece 3 (a length of 80 mm, a width of 10 mm and a thickness of 4 mm) and a tensile test piece 4 (a length of 170 mm, a width of 20 mm, a thickness of 4 mm, and a width of a tensile test portion of 10 mm).

<Charpy Impact Strength Measurement Condition>

Measurement is conducted on a V-notched test piece 3 that is left under a −30° C. atmosphere for 12 hours or more by a method according to ISO 179.

<L* Measurement Condition>

L* is measured for the tensile test piece 4 using a spectrophotometer CM-508D made by Konica Minolta Sensing, Inc. on a side opposite to a gate.

A composite polymer (g) according to the present invention is preferably a composite polymer (gb) which contains 15 to 80% by mass of polyorganosiloxane, and has a mass average particle diameter of 110 to 250 nm, in which a proportion of the particle having a particle diameter less than 100 nm is 20% by mass or less based on the total amount of the particle, and in which a proportion of the composite polymer particle having a particle diameter of 300 nm or more is 20% by mass or less based on the total amount of the particle. A graft copolymer (Gb) according to the present invention is preferably a copolymer obtained by graft polymerizing a mixture of a vinyl cyanide-based monomer and an aromatic vinyl-based monomer with the composite polymer (gb).

The molded body obtained from the graft copolymer (Gb) preferably has performances as below:

(1') L* is 1 or more and 24 or less, and (2') a Charpy impact strength at −30° C. is 6 kJ/m$^2$ or more and 30 kJ/m$^2$ or less.

The polyorganosiloxane that forms the composite polymer (gb) preferably contains 0.5 to 3 parts by mass of the component derived from a siloxane-based crosslinking agent based on 100 parts by mass of organosiloxane.

The vinyl-based polymer that forms the composite polymer (gb) is an acrylic acid ester-based polymer obtained by polymerizing an acrylic acid ester monomer or a monomer mixture containing one or more acrylic acid ester monomers.

Examples of the acrylic acid ester-based monomers include the same as those used in production of the composite polymer (ga). These can be used alone or in combination. Among these, n-butyl acrylate is preferable because the resin composition to be obtained has high impact resistance.

In the vinyl-based monomer that forms the composite polymer (gb), a grafting agent and a crosslinking agent can be used if necessary. For the grafting agent and the crosslinking agent, the same polyfunctional monomers as those used in production of the composite polymer (ga) can be used. These may be used alone or in combination. The amount of the polyfunctional monomer to be used is preferably 0.1 to 5 parts by mass, more preferably 0.2 to 2 parts by mass, and most preferably 0.4 to 1.0 part by mass based on 100 parts by mass of the acrylic acid ester-based monomer. A smaller amount is preferable from the viewpoint of the impact resistance of the molded body. A larger amount is preferable from the viewpoint of an appearance of the surface of the molded body.

For the method of producing the composite polymer (gb), the same methods as those used in production of the composite polymer (ga) can be used.

For the content ratio of polyorganosiloxane to the acrylic acid ester-based polymer derived from the acrylic acid ester-based monomer in the composite polymer (gb), preferably the content of polyorganosiloxane is 15 to 80% by mass and the content of the acrylic acid ester-based polymer is 85 to 20% by mass, and more preferably the content of polyorganosiloxane is 20 to 70% by mass and the content of the acrylic acid ester-based polymer is 80 to 30% by mass from the viewpoint of high impact resistance of the resin composition to be obtained, a good appearance of the surface of the molded body, and high pigment coloring properties of the molded body. As the content of polyorganosiloxane reduces, impact resistance tends to reduce. As the content of polyorganosiloxane increases, the appearance of the surface of the molded body and pigment coloring properties tend to reduce.

The mass average particle diameter of the composite polymer (gb) is preferably 110 to 250 nm, and more preferably 110 to 200 nm from the viewpoint of high impact resistance of the molded body, a good appearance of the surface, and high pigment coloring properties. As the mass average particle diameter reduces, impact resistance of the molded body tends to reduce. As the mass average particle diameter increases, the appearance of the surface of the molded body and pigment coloring properties tend to reduce.

In the composite polymer (gb), the proportion of the particle having a particle diameter less than 100 nm is preferably 20% by mass or less, and more preferably 10% by mass or less based on the total amount of the particle. The proportion of the particle having a particle diameter of 300 nm or more is preferably 20% by mass or less, and more preferably 10% by mass or less based on the total amount of the particle. When the proportion of the particle having a particle diameter less than 100 nm is excessively large, the impact resistance of the molded body tends to reduce. When the proportion of the particle having a particle diameter of 300 nm or more is 20% by mass or less, the molded body has a good balance between impact resistance and the appearance of the surface thereof.

The mass average particle diameter of the composite polymer (gb) to be used is a value measured by the same method as that in the case of the composite polymer (ga).

In order to obtain a composite polymer (gb) having a mass average particle diameter of 110 to 250 nm, the particle diameter of polyorganosiloxane and the amount of the vinyl-based monomer may be adjusted. Preferably, the mass average particle diameter of polyorganosiloxane is 100 nm to 200 nm, and Dw/Dn is 1.00 to 1.70.

Examples of the monomer for grafting include the same as those used in production of the graft copolymer (Ga) described above. A monomer mixture of an aromatic vinyl-based monomer and a vinyl cyanide-based monomer is preferable because the molded body to be obtained has high impact resistance. In particular, a mixture of styrene and acrylonitrile is preferable. Moreover, "other monomers" can be used if necessary for the vinyl-based monomer for grafting.

The "other monomers" are monomers copolymerizable with aromatic vinyl-based monomers, vinyl cyanide-based monomers, and (meth)acrylic acid ester-based monomers excluding the aromatic vinyl-based monomers, the vinyl cyanide-based monomer, and the (meth)acrylic acid ester-based monomers. Examples of the other monomers include acrylamide, methacrylamide, maleic anhydride, and N-substituted maleimide. These may be used alone or in combination. The proportion of the "other monomers" in 100% by mass of the monomer mixture for grafting is preferably 50% by mass or less, more preferably 40% by mass or less, and most preferably 20% by mass or less. If the proportion of the other monomers is the upper limit or less, impact resistance of the molded body and the appearance of the surface are well balanced.

The mass ratio of the composite polymer (gb) as raw materials to the monomer for grafting is not in particular limited. Preferably, the ratio of the composite polymer (gb) is 5 to 95% by mass and the ratio of the monomer for grafting is 95 to 5% by mass, more preferably the ratio of the composite polymer (gb) is 10 to 90% by mass and the ratio of the monomer for grafting is 90 to 10% by mass, and most preferably the ratio of the composite polymer (gb) is 30 to 70% by mass and the monomer for grafting is 70 to 30% by mass. As the content of the monomer for grafting reduces, the appearance of the surface of the molded body and pigment coloring properties tend to reduce. As the content increases, impact strength of the molded body tends to reduce.

The graft copolymer (Gb) is preferably produced by emulsion polymerizing the monomer mixture as above in the presence of the composite polymer (gb) latex. Examples of the method of polymerizing the graft copolymer (Gb) include the same method as that used in production of the graft copolymer (Ga) described above. Among these, emulsion polymerization is suitable. The same emulsifier as that used in production of the graft copolymer (Ga) described above can be used.

Examples of the polymerization initiator used in graft polymerization include the same polymerization initiators as those used in production of the graft copolymer (Ga) described above. In particular, use of ferrous sulfate, ethylenediaminetetraacetic acid disodium salt, a reducing agent and peroxide in combination is preferable.

When powders of a graft copolymer (Gb) is recovered from the latex of the graft copolymer (Gb), the same methods as those used in production of the powder of the graft copolymer (Ga) described above can be used. One of the spray drying method and the coagulation method can be used. The coagulation method is preferable.

A graft copolymer (Gb) according to the present invention can be used for a thermoplastic resin composition (Ib) by mixing the graft copolymer (Gb) with a thermoplastic resin (Hb) except for the graft copolymer (Gb).

[Thermoplastic Resin (Hb)]

The thermoplastic resin (Hb) is not in particular limited, and the same resin as the thermoplastic resin (Ha) can be used. Among these, MS resins and PMMA resins are preferable for improvement in the weatherability of the molded body, PC resins are preferable for improvement in the impact resistance of the molded body, and PBT resins are preferable for improvement in the resistance against chemicals of the molded body. For improvement in the moldability of the thermoplastic resin composition, PET resins and styrene-based resins are preferable. Modified PPE resins and polyamides are preferable for improvement in the heat resistance of the molded body. Styrene-based resins are in particular preferable for a balance between the impact resistance and molding properties of the molded body. These thermoplastic resins (Hb) can be used alone or in combination.

The styrene-based resin is a resin including an aromatic vinyl-based monomer as an essential component and obtained by copolymerizing the aromatic vinyl-based monomer, if necessary, with other monomers such as a vinyl cyanide-based monomer such as vinyl cyanide, unsaturated carboxylic acid anhydrides, and N-substituted maleimide based monomers. These monomers may be used alone or in combination.

The styrene-based resin is preferably a resin including 0 to 40% by mass of a vinyl cyanide-based monomer unit, 40 to 80% by mass of an aromatic vinyl-based monomer unit, and 0 to 60% by mass of another monomer unit whose monomer is copolymerizable with these monomers. Specifically, AS resins, α-SAN resins, and copolymers made from vinyl cyanide-based monomer, aromatic vinyl-based monomer and N-substituted phenylmaleimide are in particular preferable. For the vinyl cyanide-based monomer, acrylonitrile is preferable. For the aromatic vinyl-based monomer, styrene and/or α-methylstyrene is preferable.

When an AS resin or α-SAN resin is used, the composition of the polymer includes preferably 20 to 40% by mass of a vinyl cyanide-based monomer unit and 60 to 80% by mass of an aromatic vinyl-based monomer unit, and in particular preferably 25 to 35% by mass of a vinyl cyanide-based monomer unit and 65 to 75% by mass of an aromatic vinyl-based monomer unit. For the vinyl cyanide-based monomer, acrylonitrile is preferable. For the aromatic vinyl-based monomer, styrene and/or α-methylstyrene is preferable. Examples of the copolymers made from vinyl cyanide-based monomer, aromatic vinyl-based monomer and N-substituted phenylmaleimide include acrylonitrile-styrene-N-substituted phenylmaleimide ternary copolymers or acrylonitrile-styrene-α-methylstyrene-N-substituted phenylmaleimide quaternary copolymer. When the copolymer made from vinyl cyanide-based monomer, aromatic vinyl-based monomer and N-substituted phenylmaleimide is used, the composition of the polymer preferably includes 0 to 35% by mass of a vinyl cyanide-based monomer unit, 40 to 70% by mass of an aromatic vinyl-based monomer unit, and 5 to 60% by mass of an N-phenylmaleimide monomer unit.

If the proportion of the aromatic vinyl-based monomer unit contained in the styrene-based resin is the lower limit or more, the thermoplastic resin composition has high molding properties. If the proportion of the aromatic vinyl-based monomer unit is the upper limit or less, the molded article has high impact resistance. If the proportion of the vinyl cyanide-based monomer unit contained in the styrene-based resin is less than the upper limit, coloring of the molded body caused by heat can be suppressed. If the proportion of the vinyl cyanide-based monomer unit is the lower limit or more, the molded body has high impact resistance.

[Thermoplastic Resin Composition (Ib)]

The thermoplastic resin composition (Ib) according to the present invention is a composition comprising a blend of the graft copolymer (Gb) and the thermoplastic resin (Hb) except for the graft copolymer (Gb). The amount of the composite polymer (gb) existing in the thermoplastic resin composition (Ib) is preferably 5 to 50% by mass, more preferably 10 to 40% by mass, and most preferably 15 to 30% by mass. when the content of the composite polymer (gb) is 10% by mass or more, the molded body obtained from the thermoplastic resin composition has high impact resistance. when the content of the composite polymer component is 40% by mass or less, the molded body can maintain a good appearance and fluidity.

The thermoplastic resin composition (Ib) according to the present invention may contain a colorant such as pigments and dyes, a heat stabilizer, a light stabilizer, a reinforcing agent, a filler, a flame retardant, a foaming agent, a lubricant, a plasticizer, an antistatic agent, a treatment aid, and the like if necessary.

[Method of Producing Thermoplastic Resin Composition]

The thermoplastic resin composition (Ib) according to the present invention can be produced by the same method as that used in production of the thermoplastic resin composition (Ia) described above.

[Molded Body]

The molded body obtained by molding the thermoplastic resin composition (Ib) according to the present invention has a good balance between impact resistance, in particular impact resistance under a low temperature, rigidity, and the appearance of the surface, and has high weatherability. For this reason, the molded body is suitably used in applications of automobile materials, construction materials, and home appliances used these days. The molded article formed of the thermoplastic resin composition (Ib) can be used in various applications. Examples of the molded body include the same molded bodies as those obtained by molding the thermoplastic resin composition (Ia).

Examples of the method of molding a molded body include the same methods as those used in the case of the thermoplastic resin composition (Ia) such as an injection molding method, an extrusion molding method, a blow molding method, a compression molding method, a calender molding method, and an inflation molding method. A post treatment such as metallization treatment can be performed on the molded body.

EXAMPLES

Hereinafter, the present invention will be specifically described. Hereinafter, "parts" designate "parts by mass," and "%" designates "% by mass." A variety of physical properties shown in Examples were evaluated by the methods shown below.

[1. Solid Content]

The polyorganosiloxane latex was dried with a hot air dryer at 180° C. for 30 minutes, and the solid content was calculated using the following formula.

solid content [%]=(mass of residue after drying at 180° C. for 30 minutes)/(mass of latex before drying)×100

[2. Reduced Viscosity]

Using an N,N-dimethylformamide solution of the thermoplastic resin Ha or Hb having a concentration of 0.2 [g/dL], the reduced viscosity of the thermoplastic resin was measured at 25° C. with an Ubbelohde viscometer.

[3. Melt Volume Rate (MVR)]

The melt volume rate of the thermoplastic resin composition Ia or Ib was measured in conditions of a barrel temperature of 220° C. and a load of 98 N by the method according to ISO 1133. The melt volume rate is an index indicating the fluidity of a thermoplastic resin composition.

[4. Charpy Impact Strength]

The Charpy impact strength was measured in conditions described in the section regarding the graft copolymer (Ga) and the graft copolymer (Gb).

[5. Flexural Modulus, Bending Strength]

The bending strength and flexural modulus of the thermoplastic resin composition Ia or Ib was measured at the measurement temperature of 23° C. and the thickness of a test piece of 4 mm by a method according to the ISO test method 178.

[6. Deflection Temperature Under Load]

The deflection temperature under load of the thermoplastic resin composition Ia or Ib was measured at 1.80 MPa and the thickness of a test piece of 4 mm by a flat-wise method according to the ISO test method 75.

[7. Diffuse Reflectance (Brightness)]

The diffuse reflectance (%) was measured on the condition described in the section concerned with the graft copolymer (Ga), and brightness was evaluated. A lower value of the diffuse reflectance indicates a brighter surface of the molded article.

[8. Vibration Welding Properties]

A flat plate molded article having a thickness of 2 mm obtained by injection molding (trapezoidal shape, width of 70 mm, short side of 110 mm, and long side of 160 mm) was used. As a lens for evaluation, a sample obtained by molding a PMMA resin (ACRYPET VH4 made by MITSUBISHI RAYON CO., LTD.) by injection molding into a 3 mm sheet with a rib (trapezoidal shape, width of 70 mm, short side of 110 mm, and long side of 160 mm; rib: height of 10 mm, short side of 100 mm, and long side of 150 mm) was used.

Vibration welding was performed using a BRANSON VIBRATION WELDER 2407 made by Emerson Japan, Ltd. in conditions of an amplitude of 1 mm, a pressure of 0.3 MPa, and a sink amount of 1.5 mm. Next, the appearance of the melt portion produced by melting and bonding during vibration welding was visually observed, and evaluated according to 4 ranks as below:

Rank 1: welding fall properties and fluffing properties are very good in all the peripheries of the welding portion.

Rank 2: welding fall properties and fluffing properties are inferior in the range of 0 to less than 10% of all the peripheries of the welding portion.

Rank 3: welding fall properties and fluffing properties are inferior in the range of 10 to less than 40% of all the peripheries of the welding portion.

Rank 4: welding fall properties and fluffing properties are inferior in the range of 40% or more of all the peripheries of the welding portion.

In the evaluation criterion, "welding fall properties" means that the melt portion of the sheet and the rib continues smoothly as the appearance of the bonding portion, and "fluffing properties" means the extent of fluffing produced in the melt portion. Vibration welding properties are excellent when these properties are good.

[9. Color Developability]

"L*" was measured in conditions described in the section concerned with the graft copolymer (Gb). L* having a smaller numeric value indicates higher color developability.

Example 1

Production of Polyorganosiloxane Latex (L-1)

97.5 Parts of a cyclic organosiloxane mixture (a mixture of a trimer: 5% by mass, a tetramer: 85% by mass, a pentamer: 3%, a hexamer: 6% by mass, and a heptamer: 1% by mass, made by Shin-Etsu Chemical Co., Ltd., product name: DMC), 2 parts of tetraethoxysilane (TEOS), and 0.5 parts of γ-methacryloyloxypropyldimethoxymethylsilane (DSMA) were mixed to obtain 100 parts of an organosiloxane mixture. A solution prepared by dissolving 0.68 parts of sodium dodecylbenzenesulfonate (DBSNa) in 300 parts of deionized water was added to the organosiloxane mixture, and stirred with a homomixer at 10,000 rpm for 2 minutes. Then, the solution was passed through a homogenizer at a pressure of 20 MPa twice to obtain a stable pre-mixed emulsion (B-1).

Meanwhile, 1 part of dodecylbenzenesulfonic acid (DBSH), 1.38 parts of sulfuric acid, and 90 parts of deionized water were injected into a separable flask equiped with a cooling condenser, and a water-based medium (A-1) at a pH of 0.84 was prepared at 25° C.

The water-based medium (A-1) was heated to 90° C. In this state, the emulsion (B-1) was dropped into the water-based medium (A-1) at a rate such that the amount of organosiloxane to be fed was 0.42 parts/min (substantially for 4 hours). After dropping was completed, the temperature was kept for 2 hours, and then lowered. Next, the reaction product was kept at room temperature for 12 hours, and neutralized to a pH of 7.0 with a 10% sodium hydroxide aqueous solution to obtain a polyorganosiloxane latex (L-1).

The solid content and particle diameter of the obtained polyorganosiloxane latex (L-1) were measured by the methods above. The results are shown in Table 3.

Examples 2 to 23, Comparative Examples 1 and 2, Reference Examples 3 to 5, and Comparative Examples 6 to 8

Production of Polyorganosiloxane Latexes (L-2 to L-30)

Polyorganosiloxane latexes (L-2 to L-30) were obtained in the same manner as in Example 1 except that the compositions of the water-based medium (A) and the emulsion (B), and the dropping rate of the emulsion (B) in Example 1 were changed as the condition shown in Table 1 or Table 2. Regarding the obtained polyorganosiloxane latexes, the particle diameter and the solid content were measured in the same manner as in Example 1. The results are shown in Table 3.

Comparative Example 9

Production of Polyorganosiloxane Latex (L-31)

97.5 parts of DMC, 2 parts of TEOS, and 0.5 parts of DSMA were mixed to obtain 100 parts of an organosiloxane mixture. A solution prepared by dissolving 0.68 parts of DBSNa and 0.68 parts of DBSH in 200 parts of deionized water was added to the organosiloxane mixture, and stirred with a homomixer at 10,000 rpm for 2 minutes. Then, the solution was passed through a homogenizer at a pressure of 20 MPa twice to obtain a stable pre-mixed emulsion (B).

The emulsion (B) was charged into a separable flask equiped with a cooling condenser, and kept at 85° C. for 6 hours to produce a polyorganosiloxane latex by polymerization. Next, the obtained reaction product was kept at room temperature for 12 hours, and neutralized with a 10% sodium hydroxide aqueous solution to a pH of 7.0. The particle diameter and solid content of the obtained polyorganosiloxane in the latex were measured. The results are shown in Table 3.

TABLE 1

| | | water-based medium (A) | | | | | emulsion (B) | | | | total amount of the organic acid catalyst and the emulsifier [part] |
|---|---|---|---|---|---|---|---|---|---|---|---|
| | polyorgano-siloxane latex | deionized water [part] | organic acid catalyst DBSH [part] | inorganic acid catalyst sulfuric acid [part] | pH | deionized water [part] | emulsifier kind | emulsifier amount [part] | mixture of organosiloxane composition [part] DMC/DSMA/TEOS | feed rate [part/min] | |
| Example 1 | L-1 | 90 | 1 | 1.38 | 0.84 | 300 | DBSNa | 0.68 | 97.5/0.5/2 | 0.42 | 1.68 |
| Example 2 | L-2 | 90 | 1 | 1.38 | 0.84 | 300 | DBSNa | 0.68 | 97.5/0.5/2 | 0.21 | 1.68 |
| Example 3 | L-3 | 90 | 5 | 0.83 | 0.85 | 300 | DBSNa | 0.68 | 97.5/0.5/2 | 0.21 | 5.68 |
| Example 4 | L-4 | 90 | 3 | 1.19 | 0.83 | 300 | DBSNa | 0.68 | 97.5/0.5/2 | 0.21 | 3.68 |
| Example 5 | L-5 | 90 | 2 | 1.29 | 0.81 | 300 | DBSNa | 0.68 | 97.5/0.5/2 | 0.21 | 2.68 |
| Example 6 | L-6 | 90 | 0.5 | 1.40 | 0.81 | 300 | DBSNa | 0.68 | 97.5/0.5/2 | 0.21 | 1.18 |
| Example 7 | L-7 | 90 | 0.5 | 1.40 | 0.81 | 300 | DBSNa | 2 | 97.5/0.5/2 | 0.21 | 2.50 |
| Example 8 | L-8 | 90 | 0.5 | 1.40 | 0.81 | 300 | DBSNa | 1 | 97.5/0.5/2 | 0.21 | 1.50 |
| Example 9 | L-9 | 90 | 0.4 | 1.58 | 0.82 | 300 | DBSNa | 0.68 | 97.5/0.5/2 | 0.11 | 1.08 |
| Example 10 | L-10 | 90 | 0.3 | 1.57 | 0.77 | 300 | DBSNa | 0.68 | 97.5/0.5/2 | 0.11 | 0.98 |
| Example 11 | L-11 | 90 | 1 | 1.38 | 0.84 | 300 | A500 | 1 | 97.5/0.5/2 | 0.21 | 2.00 |
| Example 12 | L-12 | 90 | 2 | 1.29 | 0.84 | 300 | DBSNa | 0.68 | 96/2/2 | 0.21 | 2.68 |
| Example 13 | L-13 | 90 | 2 | 1.29 | 0.79 | 300 | DBSNa | 0.68 | 97/2/1 | 0.21 | 2.68 |
| Example 14 | L-14 | 90 | 5 | 0.83 | 0.85 | 300 | DBSNa | 0.68 | 98/2/0 | 0.21 | 5.68 |
| Example 15 | L-15 | 90 | 5 | 0.83 | 0.85 | 300 | DBSNa | 0.68 | 97/2/1 | 0.21 | 5.68 |
| Example 16 | L-16 | 90 | 5 | 0.83 | 0.83 | 300 | DBSNa | 0.68 | 96/2/2 | 0.21 | 5.68 |
| Example 17 | L-17 | 90 | 5 | 0.83 | 0.81 | 300 | DBSNa | 0.68 | 94/2/4 | 0.21 | 5.68 |
| Example 18 | L-18 | 90 | 0.5 | 1.40 | 0.84 | 300 | DBSNa | 0.68 | 98/2/0 | 0.21 | 1.18 |
| Example 19 | L-19 | 90 | 0.5 | 1.40 | 0.84 | 300 | DBSNa | 0.68 | 97/2/1 | 0.21 | 1.18 |
| Example 20 | L-20 | 90 | 2.3 | 1.29 | 0.85 | 300 | DBSNa | 0.68 | 96/2/2 | 0.21 | 2.98 |
| Example 21 | L-21 | 90 | 0.5 | 1.40 | 0.83 | 300 | DBSNa | 0.68 | 96/2/2 | 0.21 | 1.18 |
| Example 22 | L-22 | 90 | 0.4 | 1.58 | 0.81 | 300 | DBSNa | 0.68 | 96/2/2 | 0.21 | 1.08 |
| Example 23 | L-23 | 90 | 0.5 | 1.40 | 0.84 | 300 | DBSNa | 0.68 | 94/2/4 | 0.21 | 1.18 |

TABLE 2

| | polyorgano-siloxane latex | water-based medium (A) | | | | emulsion (B) | | | | | total amount of the organic acid catalyst and the emulsifier [part] |
|---|---|---|---|---|---|---|---|---|---|---|---|
| | | organic acid catalyst | inorganic acid catalyst | | | | emulsifier | | mixture of organosiloxane | | |
| | | deionized water [part] | DBSH [part] | sulfuric acid [part] | pH | deionized water [part] | kind | amount [part] | composition [part] DMC/DSMA/TEOS | feed rate [part/min] | |
| Comparative Ex. 1 | L-24 | 90 | 10 | — | 0.86 | 300 | DBSNa | 0.68 | 98/2/0 | 0.83 | 10.67 |
| Comparative Ex. 2 | L-25 | 90 | 2 | — | 1.11 | 300 | DBSNa | 0.68 | 97.5/0.5/2 | 0.83 | 2.67 |
| Reference Ex. 3 | L-26 | 90 | 0.1 | 1.52 | 0.79 | 300 | DBSNa | 0.68 | 97.5/0.5/2 | 0.42 | 0.78 |
| Reference Ex. 4 | L-27 | 90 | 0.1 | 1.52 | 0.79 | 300 | DBSNa | 0.68 | 97.5/0.5/2 | 0.21 | 0.78 |
| Reference Ex. 5 | L-28 | 90 | 0.1 | 1.52 | 0.79 | 300 | DBSNa | 0.68 | 97.5/0.5/2 | 0.11 | 0.78 |
| Comparative Ex. 6 | L-29 | 50 | — | — | 6.51 | 40 | DBSH | 1 | 97.5/0.5/2 | 1.11 | 1.00 |
| Comparative Ex. 7 | L-29-2 | 50 | — | — | 6.55 | 40 | DBSH | 1 | 97.5/0.5/2 | 0.21 | 1.00 |
| Comparative Ex. 8 | L-30 | 50 | 0.05 | — | 1.35 | 40 | DBSH | 1 | 97.5/0.5/2 | 1.11 | 1.05 |
| Comparative Ex. 9 | L-31 | — | — | — | — | 200 | DBSNa DBSH | 0.68 0.68 | 97.5/0.5/2 | — | 1.36 |

TABLE 3

| | polyorgano siloxane latex | average particle diameter | | | | solid content [%] |
|---|---|---|---|---|---|---|
| | | Dw [nm] | Dn [nm] | Dw/Dn | Dw standard deviation | |
| Example 1 | L-1 | 133 | 84 | 1.58 | 100 | 17.3 |
| Example 2 | L-2 | 154 | 145 | 1.06 | 47 | 18.2 |
| Example 3 | L-3 | 100 | 94 | 1.06 | 14 | 16.4 |
| Example 4 | L-4 | 110 | 100 | 1.10 | 36 | 17.8 |
| Example 5 | L-5 | 132 | 118 | 1.12 | 25 | 17.7 |
| Example 6 | L-6 | 159 | 145 | 1.10 | 31 | 18.0 |
| Example 7 | L-7 | 130 | 118 | 1.10 | 33 | 16.1 |
| Example 8 | L-8 | 130 | 124 | 1.05 | 17 | 17.1 |
| Example 9 | L-9 | 172 | 155 | 1.11 | 30 | 17.4 |
| Example 10 | L-10 | 186 | 151 | 1.23 | 54 | 16.7 |
| Example 11 | L-11 | 171 | 134 | 1.28 | 169 | 18.8 |
| Example 12 | L-12 | 132 | 118 | 1.12 | 23 | 17.3 |
| Example 13 | L-13 | 129 | 108 | 1.19 | 34 | 17.6 |
| Example 14 | L-14 | 102 | 94 | 1.09 | 14 | 17.8 |
| Example 15 | L-15 | 108 | 96 | 1.06 | 12 | 17.6 |
| Example 16 | L-16 | 100 | 94 | 1.06 | 13 | 17.9 |
| Example 17 | L-17 | 104 | 99 | 1.05 | 12 | 17.7 |
| Example 18 | L-18 | 184 | 147 | 1.25 | 63 | 16.6 |
| Example 19 | L-19 | 166 | 148 | 1.12 | 35 | 17.4 |
| Example 20 | L-20 | 122 | 96 | 1.27 | 41 | 17.9 |
| Example 21 | L-21 | 154 | 133 | 1.16 | 30 | 16.9 |
| Example 22 | L-22 | 172 | 155 | 1.11 | 32 | 17.4 |
| Example 23 | L-23 | 153 | 135 | 1.13 | 35 | 17.7 |
| Comparative Ex. 1 | L-24 | 62 | 58 | 1.07 | 12 | 19.2 |
| Comparative Ex. 2 | L-25 | 179 | 104 | 1.72 | 39 | 17.7 |
| Reference Ex. 3 | L-26 | 392 | 284 | 1.38 | 102 | 17.4 |
| Reference Ex. 4 | L-27 | 402 | 293 | 1.37 | 139 | 16.5 |
| Reference Ex. 5 | L-28 | 358 | 334 | 1.07 | 97 | 18.4 |
| Comparative Ex. 6 | L-29 | 470 | 168 | 2.80 | 238 | 40.0 |
| Comparative Ex. 7 | L-29 | 357 | 144 | 2.48 | 238 | 40.0 |
| Comparative Ex. 8 | L-30 | 523 | 138 | 3.79 | 231 | 36.0 |
| Comparative Ex. 9 | L-31 | 254 | 86 | 2.95 | 97 | 28.3 |

Regarding the polyorganosiloxane latex in Example 1, the pH of the water-based medium (A) was within the range of 0.1 to 1.2, and therefore Dw/Dn was 1.58. Namely, the particle diameter distribution was narrow. Further, as in Example 2, at a slower feeding rat of the emulsion (B), a polyorganosiloxane latex having a smaller Dw/Dn of 1.06 and a narrower particle diameter distribution could be obtained. In Example 3 in which the total amount of the organic acid catalyst and the emulsifier was changed, the mass average particle diameter could be reduced while the narrow particle diameter distribution was kept.

As in Examples 3 to 10 and 12 to 23, by changing the total amount of the organic acid catalyst and the emulsifier, a polyorganosiloxane latex having any mass average particle diameter and a narrow particle diameter distribution could be obtained.

In Example 11, polyoxyethylene distyrenated phenylether (made by Kao Corporation, trade name: EMULGEN A-500) that is a nonionic emulsifier was used as an emulsifier for the emulsion (B) instead of DBSNa. Example 11 shows that a polyorganosiloxane latex having a narrow particle diameter distribution could stably be produced.

In Comparative Example 1 in which the total amount of the organic acid catalyst and the emulsifier was large, the mass average particle diameter of the polyorganosiloxane latex was less than 100 nm.

In Comparative Examples 6 to 8 in which the pH of the water-based medium (A) was more than 1.2, the mass average particle diameter of polyorganosiloxane was large, Dw/Dn was large, and the particle diameter distribution was wide.

In Comparative Example 9 in which an emulsion (B) was not dropped, Dw/Dn of the obtained polyorganosiloxane was large and the particle diameter distribution was wide.

Example 24

Production of Graft Copolymer (Ga-1)

7 parts of the polyorganosiloxane latex (L-12) obtained in Example 12 (in terms of the solid content), 0.7 parts of dipotassium alkenylsuccinate (made by Kao Corporation, trade name: LATEMUL ASK, hereinafter, abbreviated to "ASK"), and 197 parts of deionized water (including water in the polyorganosiloxane latex) were charged into a separable flask equiped with a cooling condenser, and mixed. Next, a mixture of 43 parts of n-butyl acrylate (n-BA), 0.3 parts of allyl methacrylate (AMA), 0.01 parts of 1,3-butylene dimethacrylate (1,3-BD), and 0.11 parts of t-butyl hydroperoxide(t-BH) was added into the flask.

A nitrogen stream was passed through the flask to replace the internal atmosphere with nitrogen, and the inner temperature was raised to 60° C. At this point, an aqueous solution including 0.000075 parts of ferrous sulfate heptahydrate (Fe), 0.000225 parts of ethylenediaminetetraacetic acid disodium salt (EDTA), 0.2 parts of sodium formaldehyde sulfoxylate (SFS), and 8 parts of deionized water was added to initiate radical polymerization. Polymerization of the monomer component raised the temperature of the solution to 78° C. Subsequently, the temperature was lowered to 75° C., and kept for 30 minutes. Polymerization of the monomer component was completed to obtain a latex of a composite polymer (ga-1) consisting of polyorganosiloxane (L-12) and a polymer of n-BA.

The composite polymer (ga-1) had a mass average particle diameter of 182 nm. In 100% by mass of the composite polymer (in terms of the solid content), the proportion of the composite polymer particle having a particle diameter of 400 nm or more was 0%, and the proportion of the composite polymer particle having a particle diameter of 100 nm or less was 0%.

Further, an aqueous solution including 0.2 parts of ASK, 0.001 parts of Fe, 0.003 parts of EDTA, 0.3 parts of SFS, and 24 parts of deionized water was added to the composite polymer (ga-1) latex. Next, as a first stage polymerization, a mixed solution of 10 parts of acrylonitrile (AN), 30 parts of styrene (ST), and 0.2 parts of t-BH was dropped over 1 hour to perform polymerization. At this time, the temperature of the solution was adjusted so as to be 80° C. when dropping was completed. After dropping was completed, the temperature was lowered to 75° C., and kept for 20 minutes. Next, as a second stage polymerization, a mixture including 2.5 parts of AN, 7.5 parts of ST, 0.05 parts of t-BH, and 0.02 parts of n-octylmercaptan (nOM) was dropped over 20 minutes to perform polymerization. After dropping was completed, the state where the temperature was 75° C. was kept for 20 minutes. Then, 0.05 parts of cumene hydroperoxide (CHP) was added, and further the state where the temperature was 75° C. was kept for 30 minutes. Then, the temperature was lowered to obtain a latex of a graft copolymer (Ga-1) in which AN and ST were grafted to the composite polymer (ga-1).

Next, 150 parts of a 1% calcium acetate aqueous solution was heated to 70° C., and 100 parts of the graft copolymer (Ga-1) latex was gradually dropped into the aqueous solution to solidify the graft copolymer (Ga-1). A precipitate was dehydrated, washed, and dried to obtain a white powder of the graft copolymer (Ga-1).

Examples 25 to 32, and Comparative Examples 10 to 11

Production of Graft Copolymers (Ga-2) to (Ga-11)

Composite polymers (ga-2) to (ga-11) were obtained in the same manner as in Example 24 except that the kind and amount of polyorganosiloxane and the amount of n-BA were changed as the condition shown in Table 4. Further, graft polymerization was performed using these composite polymers and AN and ST at the amounts shown in Table 4 to obtain graft copolymers (Ga-2) to (Ga-11).

Production Example 1

Production of Thermoplastic Resin (Ha-1)

Using 25 parts of AN and 75 parts of ST, a acrylonitrile-styrene copolymer (Ha-1) whose reduced viscosity measured at 25° C. was 0.40 dL/g was produced in an N,N-dimethylformamide solution by a known suspension polymerization method.

Production Examples 2 to 6

Production of Thermoplastic Resins (Ha-2 to Ha-6)

Thermoplastic resins (Ha-2) to (Ha-6) were produced in the same manner as in Production Example 1 except that the kind and amount of the vinyl-based monomer were changed as the condition shown in Table 5. The measurement results of the reduced viscosity are shown in Table 5.

TABLE 4

| | | | composition of composite polymer | | composition of grafted part | | particle diameter of composite polymer | | |
|---|---|---|---|---|---|---|---|---|---|
| | | | | | first stage | second stage | mass average | proportion of particle having a | proportion of particle having a |
| | composite polymer | graft copolymer | kind of POSi latex | POSi/BA [part] | content of POSi [%] | AN/ST [part] | AN/ST [part] | particle diameter [nm] | diameter of 100 nm or less [%] | diameter of 400 nm or more [%] |
| Example 24 | ga-1 | Ga-1 | L-12 | 7/43 | 14 | 10/30 | 2.5/7.5 | 182 | 0 | 0 |
| Example 25 | ga-2 | Ga-2 | L-12 | 5/45 | 10 | 10/30 | 2.5/7.5 | 185 | 3 | 0 |
| Example 26 | ga-3 | Ga-3 | L-12 | 7/43 | 14 | 12/28 | 3/7 | 181 | 2 | 0 |
| Example 27 | ga-4 | Ga-4 | L-12 | 7/43 | 14 | 8/32 | 2/8 | 185 | 1.5 | 0 |
| Example 28 | ga-5 | Ga-5 | L-13 | 7/43 | 14 | 10/30 | 2.5/7.5 | 177 | 0 | 0 |
| Example 29 | ga-6 | Ga-6 | L-15 | 7/43 | 14 | 10/30 | 2.5/7.5 | 128 | 7.4 | 0 |
| Example 30 | ga-7 | Ga-7 | L-16 | 7/43 | 14 | 10/30 | 2.5/7.5 | 127 | 1.9 | 0 |
| Example 31 | ga-8 | Ga-8 | L-17 | 7/43 | 14 | 10/30 | 2.5/7.5 | 122 | 6.8 | 0 |
| Example 32 | ga-9 | Ga-9 | L-14 | 7/43 | 14 | 10/30 | 2.5/7.5 | 130 | 2.7 | 0 |
| Comparative Ex. 10 | ga-10 | Ga-10 | L-24 | 1.75/48.25 | 3.5 | 10/30 | 2.5/7.5 | 150 | 0 | 0.9 |
| Comparative Ex. 11 | ga-11 | Ga-11 | L-24 | 7/43 | 14 | 10/30 | 2.5/7.5 | 114 | 22.7 | 0 |

POSi: polyorganosiloxane
BA: n-butyl acrylate
AN: acrylonitrile
ST: styrene

TABLE 5

| Production Example | thermoplastic resin (Ha) | composition [part] | | | | η sp/c [dL/g] |
|---|---|---|---|---|---|---|
| | | AN | ST | PMID | α MS | |
| 1 | Ha-1 | 25 | 75 | | | 0.40 |
| 2 | Ha-2 | 28 | 72 | | | 0.62 |
| 3 | Ha-3 | 34 | 66 | | | 0.48 |
| 4 | Ha-4 | 22 | 55 | 23 | | 0.66 |
| 5 | Ha-5 | 14 | 53 | 33 | | 0.68 |
| 6 | Ha-6 | 28 | 24 | 11 | 37 | 0.47 |

PMID: N-phenylmaleimide
α MS: α-methylstyrene

Examples 33 to 47, and Comparative Examples 12 and 13

Production of Thermoplastic Resin Compositions (Ia-1 to Ia-17)

The graft copolymer and the thermoplastic resin composition were blended at the composition shown in Table 6, and 0.5 parts of ethylenebisstearylamide (EBS), 0.03 parts of silicone oil (made by Dow Corning Toray Co., Ltd., product name: SH-200) as additives, and 0.05 parts of carbon black #960 (made by Mitsubishi Chemical Corporation) as a colorant were added, and mixed using a Henschel mixer. Next, the mixture was fed to a volatilizing extruder (made by The Japan Steel Works, Ltd., TEX-30a) whose barrel temperature was heated to 260° C., and kneaded to obtain pellets of a resin composition. The melt volume rate of the pellets was measured. Further, the pellets were formed into a test piece for evaluation using a 4-ounce injection molding machine (made by The Japan Steel Works, Ltd.) at 220 to 260° C., and the Charpy impact strength (23° C.), MVR, bending strength, flexural modulus, deflection temperature under load, diffuse reflectance (brightness), and vibration welding properties were measured. The results are shown in Table 6 and Table 7.

In Examples 46 and 47, a polycarbonate resin (made by Mitsubishi Engineering-Plastics Corporation, trade name: Iupilon S-2000F, hereinafter, abbreviated to "Ha-7") was used as a thermoplastic resin composition.

As shown in Examples 33 to 47 in Table 6 and Table 7, the graft copolymers (Ga-1) to (Ga-9) according to the present invention can produce a thermoplastic resin having high physical properties such as impact strength and fluidity, low diffuse reflectance, remarkable brightness, and high vibration welding properties. In contrast, in Comparative Example 12, although the particle diameter of the composite polymer meets the requirement of Claims, the thermoplastic resin showed reduced brightness because the mass average particle diameter (Dw) of the polyorganosiloxane (L-24) was small. In Comparative Example 13, impact strength and brightness were reduced because the mass average particle diameter (Dw) of the polyorganosiloxane (L-24) was small and the composite polymer had a large proportion of the particle having a particle diameter of 100 nm or less.

TABLE 6

| | | Example 33 | Example 34 | Example 35 | Example 36 | Example 37 | Example 38 | Example 39 | Example 40 |
|---|---|---|---|---|---|---|---|---|---|
| thermoplastic resin composition (Ia) | | Ia-1 | Ia-2 | Ia-3 | Ia-4 | Ia-5 | Ia-6 | Ia-7 | Ia-8 |
| graft copolymer | Ga-1 | 33 | | | | 26 | 40 | 28 | 34 |
| (Ga) | Ga-2 | | 33 | | | | | | |
| [part] | Ga-3 | | | 33 | | | | | |
| | Ga-4 | | | | 33 | | | | |
| | Ga-5 | | | | | | | | |
| | Ga-6 | | | | | | | | |
| | Ga-7 | | | | | | | | |
| | Ga-8 | | | | | | | | |
| | Ga-9 | | | | | | | | |
| thermoplastic resin (Ha) [part] | Ha-1 | 9 | 9 | 9 | 9 | | | | |
| | Ha-2 | 8 | 8 | 8 | 8 | 36 | 22 | | |
| | Ha-3 | | | | | | | 47 | 41 |
| | Ha-4 | 50 | 50 | 50 | 50 | | | | |
| | Ha-5 | | | | | 38 | 38 | | |
| | Ha-6 | | | | | | | 25 | 25 |
| | Ha-7 | | | | | | | | |
| Charpy impact strength (23° C.) | kJ/m² | 9.3 | 8.8 | 9.5 | 8.3 | 6.0 | 12.2 | 7.1 | 9.6 |
| MVR | cm³/10 min | 5.1 | 5.0 | 4.2 | 5.5 | 8.9 | 4.0 | 17.0 | 14.0 |
| bending strength | MPa | 79 | 81 | 80 | 81 | 87 | 70 | 82 | 74 |
| flexural modulus | MPa | 2470 | 2500 | 2510 | 2530 | 2710 | 2200 | 2750 | 2490 |
| deflection temperature under load | ° C. | 95 | 95 | 95 | 94 | 96 | 94 | 86 | 85 |
| diffuse reflectance (brightness) | % | 3.8 | 4.3 | 4.1 | 4.3 | 3.5 | 4.3 | 3.0 | 3.0 |
| vibration welding | rank | 2 | 2 | 2 | 2 | 2 | 2 | 2 | 2 |

TABLE 7

| | | Example 41 | Example 42 | Example 43 | Example 44 | Example 45 | Example 46 | Example 47 | Comparative Ex. 12 | Comparative Ex. 13 |
|---|---|---|---|---|---|---|---|---|---|---|
| thermoplastic resin composition (Ia) | | Ia-9 | Ia-10 | Ia-11 | Ia-12 | Ia-13 | Ia-14 | Ia-15 | Ia-16 | Ia-17 |
| graft copolymer (Ga) [part] | Ga-1 | | | | | | 33 | 33 | | |
| | Ga-2 | | | | | | | | | |
| | Ga-3 | | | | | | | | | |
| | Ga-4 | | | | | | | | | |
| | Ga-5 | 33 | | | | | | | | |
| | Ga-6 | | 33 | | | | | | | |
| | Ga-7 | | | 33 | | | | | | |
| | Ga-8 | | | | 33 | | | | | |
| | Ga-9 | | | | | 33 | | | | |
| | Ga-10 | | | | | | | | 33 | |
| | Ga-11 | | | | | | | | | 33 |
| thermoplastic resin (Ha) [part] | Ha-1 | | 9 | 9 | 9 | 9 | | | 9 | 9 |
| | Ha-2 | 29 | 8 | 8 | 8 | 8 | 47 | 27 | 8 | 8 |
| | Ha-3 | | | | | | | | | |
| | Ha-4 | | 50 | 50 | 50 | 50 | | | 50 | 50 |
| | Ha-5 | 38 | | | | | | | | |
| | Ha-6 | | | | | | | | | |
| | Ha-7 | | | | | | 20 | 40 | | |
| Charpy impact strength (23° C.) | kJ/m$^2$ | 9.7 | 7.8 | 7.5 | 7.6 | 7.1 | 21 | 50 | 7.3 | 5.1 |
| MVR | cm$^2$/10 min | 5.8 | 4.5 | 4.5 | 4.6 | 4.4 | 12.1 | 7.7 | 4.8 | 4.3 |
| bending strength | MPa | 80 | 83 | 82 | 83 | 81 | 71 | 71 | 80 | 84 |
| flexural modulus | MPa | 2560 | 2490 | 2480 | 2480 | 2440 | 2200 | 1990 | 2490 | 2500 |
| deflection temperature under load | ° C. | 94 | 93 | 94 | 94 | 94 | 87 | 93 | 95 | 95 |
| diffuse reflectance (brightness) | % | 4.3 | 3.6 | 3.7 | 3.7 | 4.5 | 3.8 | 4.4 | 5.1 | 5.1 |
| vibration welding | rank | 2 | 2 | 2 | 2 | 2 | 2 | 2 | 2 | 2 |

Ha-7: a polycarbonate resin (Mitsubishi Engineering-Plastics Corporation, trade name: Iupilon S-2000F)

Example 48

Production of Graft Copolymer (Gb-1)

A mixture of 25 parts of the polyorganosiloxane latex (L-12) obtained in Example 12 (in terms of the solid content), 25 parts of n-BA, 0.2 parts of AMA, 0.05 parts of 1,3-BD, 0.063 parts of t-BH, and 208 parts of deionized water (including water in the polyorganosiloxane latex) was charged into a separable flask equiped with a cooling condenser. Next, a nitrogen stream was passed through the flask to replace the atmosphere, and the inner temperature was raised to 60° C. At this point, an aqueous solution including 0.00005 parts of Fe, 0.00015 parts of EDTA, 0.12 parts of SFS, and 4 parts of deionized water was added to initiate polymerization. After the maximum point of the inner temperature was recognized from heat generated by polymerization of the monomer component, the temperature was lowered to 65° C., and kept for 30 minutes. Then, polymerization of the monomer component was completed to obtain a latex of a composite polymer (gb-1) consisting of polyorganosiloxane (L-12) and a polymer of n-BA. Regarding the obtained composite polymer (gb-1), the mass average particle diameter was 140 nm, the proportion of the composite polymer particle having a particle diameter less than 100 nm was 7%, and the proportion of the composite polymer particle having a particle diameter of 300 nm or more was 1.3%.

Next, an aqueous solution including 0.001 parts of Fe, 0.003 parts of EDTA, 0.3 parts of SFS, 0.55 parts of DBSNa, and 11 parts of deionized water was added to the composite polymer (gb-1) latex. Further, while a mixed solution of 12.5 parts of AN, 37.5 parts of ST, and 0.23 parts of t-BH was dropped over 100 minutes, the temperature was raised to 80° C. After dropping was completed, the state where the temperature was 80° C. was kept for 20 minutes. Then, 0.05 parts of CHP was added, and the temperature was kept for 30 minutes, and then lowered to obtain a graft copolymer (Gb-1) latex.

Meanwhile, 140 parts of an aqueous solution in which 6% calcium acetate was dissolved was prepared, and heated to 85° C. Next, while the aqueous solution was stirred, the graft copolymer (Gb-1) latex (100 parts of the solid content) was gradually dropped into the aqueous solution to solidify the graft copolymer (Gb-1). Further, the temperature was raised to 95° C., and kept for 5 minutes. The obtained solidified product was dehydrated, washed, and dried to obtain a powder of the graft copolymer (Gb-1).

Examples 49 to 60, and Comparative Examples 14 to 17

Production of Graft Copolymers (Gb-2) to (Gb-17)

Composite polymers (gb-2) to (gb-17) were obtained in the same manner as in Example 48 except that the kind and amount of polyorganosiloxane and the amount of n-BA were changed as the condition shown in Table 8. Further, using these composite polymers and AN and ST at the amounts shown in Table 8, graft polymerization was performed to obtain graft copolymers (Gb-2) to (Gb-17). In Comparative Example 16, a mixture of 83 parts of (L-24) and 17 parts of (L-31) in terms of the solid content was used as the polyorganosiloxane latex (L-32). The mass average particle diameter (Dw) of the polyorganosiloxane (L-32) was 101 nm, the number average particle diameter (Dn) was 58 nm, and the particle diameter distribution (Dw/Dn) expressed as the ratio thereof was 1.74.

Production Examples 7 to 9

Production of Thermoplastic Resins (Hb-1) to (Hb-3)

Using the kind and amount of the vinyl-based monomers shown in Table 9, copolymers (Hb-1) to (Hb-3) were produced by a known suspension polymerization method. The reduced viscosity of each copolymer measured in an N,N-dimethylformamide solution at 25° C. was shown in Table 9.

pellets of each of the thermoplastic resin compositions (Ib-1) to (Ib-23). The melt volume rate of each pellet was measured.

The pellets were formed into a test piece for evaluation with a 4-ounce injection molding machine (made by The Japan Steel Works, Ltd.) at 230° C. The measurement results of the melt volume rate, flexural modulus, deflection temperature under load, Charpy impact strengths at 23° C. and −30° C., and color developability are shown in Tables 10 to

TABLE 8

| | | | composition of composite polymer | | composition of grafted part | | mass average particle diameter [nm] | particle diameter of composite polymer | |
|---|---|---|---|---|---|---|---|---|---|
| | composite polymer | graft copolymer | kind of POSi latex | POSi/BA [part] | content of POSi [%] | AN [part] | ST [part] | | proportion of particle having a diameter of 100 nm or less [%] | proportion of particle having a diameter of 300 nm or more [%] |
| Example 48 | gb-1 | Gb-1 | L-12 | 25/25 | 50 | 12.5 | 37.5 | 140 | 7.0 | 1.3 |
| Example 49 | gb-2 | Gb-2 | L-12 | 10/40 | 20 | 12.5 | 37.5 | 170 | 0.8 | 4.9 |
| Example 50 | gb-3 | Gb-3 | L-12 | 15/35 | 30 | 12.5 | 37.5 | 160 | 6.1 | 6.0 |
| Example 51 | gb-4 | Gb-4 | L-12 | 20/30 | 40 | 12.5 | 37.5 | 150 | 1.1 | 1.6 |
| Example 52 | gb-5 | Gb-5 | L-12 | 35/15 | 70 | 12.5 | 37.5 | 135 | 12.9 | 2.0 |
| Example 53 | gb-6 | Gb-6 | L-13 | 25/25 | 50 | 12.5 | 37.5 | 140 | 8.9 | 0.8 |
| Example 54 | gb-7 | Gb-7 | L-19 | 25/25 | 50 | 12.5 | 37.5 | 160 | 3.4 | 6.7 |
| Example 55 | gb-8 | Gb-8 | L-20 | 25/25 | 50 | 12.5 | 37.5 | 140 | 11.7 | 2.1 |
| Example 56 | gb-9 | Gb-9 | L-21 | 25/25 | 50 | 12.5 | 37.5 | 160 | 0.7 | 2.1 |
| Example 57 | gb-10 | Gb-10 | L-22 | 25/25 | 50 | 12.5 | 37.5 | 190 | 0.0 | 5.3 |
| Example 58 | gb-11 | Gb-11 | L-23 | 25/25 | 50 | 12.5 | 37.5 | 160 | 4.1 | 5.0 |
| Example 59 | gb-12 | Gb-12 | L-12 | 20/30 | 40 | 15.0 | 35.0 | 150 | 1.1 | 1.6 |
| Example 60 | gb-13 | Gb-13 | L-12 | 24/36 | 40 | 12.0 | 28.0 | 150 | 4.3 | 1.2 |
| Comparative Ex. 14 | gb-14 | Gb-14 | L-24 | 25/25 | 50 | 12.5 | 37.5 | 70 | 88.5 | 0.1 |
| Comparative Ex. 15 | gb-15 | Gb-15 | L-31 | 25/25 | 50 | 12.5 | 37.5 | 210 | 2.6 | 20.7 |
| Comparative Ex. 16 | gb-16 | Gb-16 | L-32 | 25/25 | 50 | 12.5 | 37.5 | 90 | 66.9 | 1.9 |
| Comparative Ex. 17 | gb-17 | Gb-17 | L-24 | 7/43 | 14 | 12.5 | 37.5 | 90 | 47.9 | 0.0 |

TABLE 9

| Production Example | thermoplastic resin (Hb) | composition [part] | | | η sp/c [dL/g] |
|---|---|---|---|---|---|
| | | AN | ST | PMID | |
| 7 | Hb-1 | 34 | 66 | | 0.62 |
| 8 | Hb-2 | 29 | 71 | | 0.61 |
| 9 | Hb-3 | | 48 | 52 | 0.64 |

Examples 61 to 78, and Comparative Examples 18 to 22

Production of Thermoplastic Resin Compositions (Ib-1 to Ib-23)

The graft copolymers (Gb-1) to (Gb-17) and the thermoplastic resins (Hb-1) to (Hb-3) were blended at the corresponding composition shown in Tables 10 to 12. Further, 0.3 parts of EBS as a lubricant and 0.5 parts of carbon black #960 as a colorant were mixed using a Henschel mixer. Next, the mixture was fed into a volatilizing twin screw extruder (made by Ikegai Corp., PCM-30) whose barrel temperature was heated to 230° C., and kneaded to produce 12. In Table 12, a polycarbonate resin (made by Mitsubishi Engineering-Plastics Corporation, trade name: Iupilon S-3000) was used as Hb-4.

The thermoplastic resin compositions in Examples 61 to 78 using the graft copolymers (Gb-1) to (Gb-13) according to the present invention could have a good balance between mechanical strength such as impact strength and flexural modulus, in particular Charpy impact strength at −30° C., and color developability. Meanwhile, in Comparative Examples 18, 21, and 22, the polyorganosiloxane (L-24) and the composite polymers (gb-14) and (gb-17) had a small mass average particle diameter (Dw), and the composite polymer had a large proportion of the particle having a particle diameter of 100 nm or less. For this reason, Charpy impact strength at −30° C. was low. Further, in Comparative Example 19, the mass average particle diameter (Dw) of the polyorganosiloxane (L-31) was large, and the composite polymer had a large proportion of the particle having a particle diameter of 300 nm or more. For this reason, Charpy impact strength at −30° C. was low, and color developability was worsened. In Comparative Example 20, the particle diameter distribution (Dw/Dn) of the polyorganosiloxane (L-32) was large, and therefore the mass average particle diameter (Dw) of the composite polymer (gb-16) was small, and Charpy impact strength at −30° C. was low.

TABLE 10

|  | | Example 61 | Example 62 | Example 63 | Example 64 | Example 65 | Example 66 | Example 67 | Example 68 |
|---|---|---|---|---|---|---|---|---|---|
| thermoplastic resin composition (Ib) | | Ib-1 | Ib-2 | Ib-3 | Ib-4 | Ib-5 | Ib-6 | Ib-7 | Ib-8 |
| graft copolymer (Gb) | kind | Gb-1 | Gb-2 | Gb-3 | Gb-4 | Gb-5 | Gb-6 | Gb-7 | Gb-8 |
|  | amount [part] | 42 | 42 | 42 | 42 | 42 | 42 | 42 | 42 |
| thermoplastic resin (Hb) | kind | Hb-1 | Hb-1 | Hb-1 | Hb-1 | Hb-1 | Hb-1 | Hb-1 | Hb-1 |
|  | amount [part] | 58 | 58 | 58 | 58 | 58 | 58 | 58 | 58 |
| rubber content | % | 21 | 21 | 21 | 21 | 21 | 21 | 21 | 21 |
| MVR | $cm^3$/10 min | 11 | 13 | 12 | 13 | 10 | 12 | 12 | 13 |
| flexural modulus | MPa | 2180 | 2210 | 2230 | 2240 | 2240 | 2250 | 2150 | 2230 |
| deflection temperature under load | °C. | 82 | 83 | 83 | 83 | 83 | 83 | 81 | 83 |
| Charpy impact strength | 23° C. kJ/$m^2$ | 22 | 21 | 23 | 23 | 16 | 24 | 21 | 22 |
|  | −30° C. | 12 | 8 | 9 | 11 | 9 | 12 | 12 | 11 |
| color developability (L*) | | 18 | 19 | 19 | 19 | 19 | 18 | 20 | 18 |

TABLE 11

|  | | Example 69 | Example 70 | Example 71 | Example 72 | Example 73 | Comparative Ex. 18 | Comparative Ex. 19 | Comparative Ex. 20 |
|---|---|---|---|---|---|---|---|---|---|
| thermoplastic resin composition (Ib) | | Ib-9 | Ib-10 | Ib-11 | Ib-12 | Ib-13 | Ib-14 | Ib-15 | Ib-16 |
| graft copolymer (Gb) | kind | Gb-9 | Gb-10 | Gb-11 | Gb-12 | Gb-13 | Gb-14 | Gb-15 | Gb-16 |
|  | amount [part] | 42 | 42 | 42 | 42 | 35 | 42 | 42 | 42 |
| thermoplastic resin (Hb) | kind | Hb-1 | Hb-1 | Hb-1 | Hb-1 | Hb-1 | Hb-1 | Hb-1 | Hb-1 |
|  | amount [part] | 58 | 58 | 58 | 58 | 65 | 58 | 58 | 58 |
| rubber content | % | 21 | 21 | 21 | 21 | 21 | 21 | 21 | 21 |
| MVR | $cm^3$/10 min | 13 | 12 | 12 | 9 | 12 | 10 | 14 | 13 |
| flexural modulus | MPa | 2180 | 2190 | 2220 | 2240 | 2270 | 2280 | 2310 | 2330 |
| deflection temperature under load | °C. | 82 | 82 | 83 | 83 | 83 | 83 | 83 | 83 |
| Charpy impact strength | 23° C. kJ/$m^2$ | 18 | 18 | 15 | 25 | 24 | 8 | 7 | 13 |
|  | −30° C. | 11 | 11 | 8 | 12 | 11 | 3 | 4 | 5 |
| color developability (L*) | | 20 | 21 | 19 | 17 | 14 | 13 | 25 | 18 |

TABLE 12

|  | | Example 74 | Example 75 | Example 76 | Example 77 | Example 78 | Comparative Ex. 21 | Comparative Ex. 22 |
|---|---|---|---|---|---|---|---|---|
| thermoplastic resin composition (Ib) | | Ib-17 | Ib-18 | Ib-19 | Ib-20 | Ib-21 | Ib-22 | Ib-23 |
| graft copolymer (Gb) | kind | Gb-4 | Gb-4 | Gb-4 | Gb-4 | Gb-4 | Gb-17 | Gb-17 |
|  | amount [part] | 30 | 34 | 38 | 42 | 44 | 42 | 44 |
| thermoplastic resin (Hb) [part] | Hb-1 | 70 | 66 | 62 | 48 |  | 48 |  |
|  | Hb-2 |  |  |  |  |  | 37 |  | 37 |
|  | Hb-3 |  |  |  |  |  | 19 |  | 19 |
|  | Hb-4 |  |  |  |  | 10 |  | 10 |
| rubber content | % | 15 | 17 | 19 | 21 | 22 | 21 | 22 |
| MVR | $cm^3$/10 min | 17 | 16 | 13 | 8 | 3 | 8 | 3 |
| flexural modulus | MPa | 2700 | 2560 | 2420 | 2150 | 2120 | 2140 | 2100 |
| deflection temperature under load | °C. | 84 | 83 | 83 | 86 | 92 | 86 | 92 |
| Charpy impact strength | 23° C. kJ/$m^2$ | 12 | 16 | 21 | 19 | 15 | 17 | 13 |
|  | −30° C. | 5 | 6 | 9 | 10 | 6 | 5 | 2 |
| color developability (L*) | | 17 | 18 | 19 | 20 | 21 | 17 | 18 |

Hb-4: a polycarbonate resin (Mitsubishi Engineering-Plastics Corporation, trade name: Iupilon S-3000)

INDUSTRIAL APPLICABILITY

The polyorganosiloxane latex according to the present invention can be widely used as raw materials for resin additives, fiber treatment agents, mold release agents, cosmetics, antifoaming agents, additives for a coating material, and the like. The graft copolymer obtained using the polyorganosiloxane latex according to the present invention is in particular useful as raw materials for resin additives because a thermoplastic resin composition having a narrow particle distribution and suitable properties for intended applications can be produced.

The invention claimed is:

1. A method of preparing a polyorganosiloxane latex, where a polyorganosiloxane particle of the latex has a mass average particle diameter (Dw) of 100 to 200 nm, and where a ratio (Dw/Dn) of the mass average particle diameter (Dw) to a number average particle diameter (Dn) is 1.0 to 1.7, the method comprising:

dropping an emulsion (B) comprising an organosiloxane, an emulsifier, and water into a water-based medium (A) comprising water, an organic acid catalyst, and an inorganic acid catalyst; and polymerizing the organosiloxane, wherein:
a total amount of the organic acid catalyst and the emulsifier is 0.5 to 6 parts by mass based on 100 parts by mass of the organosiloxane,
the water-based medium (A) is at a pH within the range of 0 to 1.2 when measured at 25° C., and
the dropping of the emulsion (B) is at a rate such that an amount of the organosiloxane fed is 0.5 parts by mass/min or less when a total amount of the organosiloxane to be used is 100 parts by mass.

2. The method according to claim 1, wherein a standard deviation of the mass average particle diameter (Dw) of the polyorganosiloxane particle is 0 to 80.

3. The method according to claim 1, wherein a proportion of the polyorganosiloxane particles having a particle diameter of less than 50 nm is 5% by mass or less based on the total amount of the particles, and wherein a proportion of the polyorganosiloxane particles having a particle diameter of 300 nm or more is 20% by mass or less based on the total amount of the particles.

4. The method according to claim 1, wherein the polyorganosiloxane particle has a mass average particle diameter (Dw) of 100 to 190 nm.

5. A method of preparing a polyorganosiloxane-containing vinyl-based copolymer comprising:
preparing by the method according to claim 1 the polyorganosiloxane latex, and
polymerizing one or more vinyl-based monomers in the presence of the polyorganosiloxane latex.

6. The method of claim 5, where a particle of the polyorganosiloxane-containing vinyl-based copolymer has a mass average particle diameter (Dw) of 110 nm to 800 nm, and a ratio (Dw/Dn) of the mass average particle diameter (Dw) to a number average particle diameter (Dn) is 1.0 to 2.0.

7. The method of claim 5, wherein the vinyl-based monomer is an acrylic acid ester.

* * * * *